United States Patent [19]

Umeda et al.

[11] Patent Number: 5,463,545
[45] Date of Patent: Oct. 31, 1995

[54] FUNCTIONAL REDUNDANCY CONTROL SYSTEM

[75] Inventors: Yasushi Umeda, Chofu; Tetsuo Tomiyama, Chiba; Hiroyuki Yoshikawa, Tokyo; Yuichi Koike, Tokorozawa, all of Japan

[73] Assignee: Mita Industrial Co., Ltd., Japan

[21] Appl. No.: 393,244

[22] Filed: Feb. 23, 1995

Related U.S. Application Data

[63] Continuation of Ser. No. 989,511, Dec. 11, 1992, abandoned.

[30] Foreign Application Priority Data

Dec. 19, 1991 [JP] Japan ..................... 3-336733

[51] Int. Cl.$^6$ .................... G06F 19/00; G06F 11/16
[52] U.S. Cl. ................ 364/187; 355/207; 364/551.01; 364/578; 395/912; 395/600; 395/500; 395/182.02; 395/182.13
[58] Field of Search .................. 364/184–187, 364/148, 149–151, 578, 468, 550, 551.01, 551.02; 371/8.1, 9.1, 11.3, 16.2, 16.4; 395/52, 60, 62, 912, 914, 903, 904, 906, 575; 355/205, 207

[56] References Cited

U.S. PATENT DOCUMENTS

| | | | |
|---|---|---|---|
| 4,532,594 | 7/1985 | Hosaka et al. | 364/187 X |
| 4,741,170 | 5/1988 | Tershak | 62/229 |
| 4,802,710 | 2/1989 | Burgdorf et al. | 303/11 |
| 4,823,256 | 4/1989 | Bishop et al. | 364/187 X |
| 4,841,431 | 6/1989 | Takagi et al. | 364/187 |
| 4,965,743 | 10/1990 | Malin et al. | 395/50 |
| 5,187,773 | 2/1993 | Hamilton et al. | 395/912 X |

FOREIGN PATENT DOCUMENTS

| | | |
|---|---|---|
| 199273 | 10/1986 | European Pat. Off. . |
| 350295 | 1/1990 | European Pat. Off. . |
| 2104247 | 3/1983 | United Kingdom . |

OTHER PUBLICATIONS

Umeda et al—"Function, Behavior, Structure"—Proceedings of Fifth Int'l Conference, Applications of Artificial Intelligence in Engineering—1990—Inspec Abstract No. B91054458; C91055550.

"Processing System", *IBM Technical Disclosure Bulletin*, vol. 11, No. 5, Oct. 1968, pp. 515–516.

Patent Abstracts of Japan, vol. 13, No. 4 (P–809) 9 Jan. 1989 & JP–A–63 213 035 (Mitsubishi) 5 Sep. 1988.

*Primary Examiner*—Joseph Ruggiero
*Attorney, Agent, or Firm*—Beveridge, DeGrandi Weilacher & Young

[57] ABSTRACT

A so-called "softly broken apparatus" by constructing a self-repair apparatus based on functional redundancy. An apparatus is represented in a form including a function using an FBS diagram (a diagram comprising functions, behaviors and states). When a fault occurs, a function lost is retrieved by the FBS diagram, and a functional part capable of developing the lost function by a potential function is detected. The potential function of the functional part is developed, thereby to recover the lost function. Specifically, when a fault occurs in an apparatus, a lost function is recovered by utilizing a part which originally exists in the apparatus by utilizing the existing part as a substitute for the part which fails.

21 Claims, 31 Drawing Sheets

T...OUTPUT TORQUE(CONSTANT)
v...ROTATION SPEED

Tin...INPUT TORQUE
v...ROTATION SPEED
Vout...OUTPUT VOLTAGE
k...CONSTANT
Tf...LOAD TORQUE
T...TORQUE CAUSING ROTATION
  = Tin-Tf Vin...INPUT VOLTAGE
C...CHARGING AMOUNT

FIG. 23

FORMAT

| LAVEL | |
|---|---|
| FUNCTION NAME | |
| DEVELOPMENT KNOWLEDGE | |

FUNCTION 1

| CHARGE DRUM | |
|---|---|
| DEVELOPMENT KNOWLEDGE 1 | PREMISE TAG | AC PLUG SW | IN ON |
| | HOLDING CONDITION TAG | DRUM POTENTIAL ≥ NORMAL | |

DEVELOPMENT KNOWLEDGE 1

| FUNCTION 2 | FUNCTION 3 | FUNCTION 4 |
|---|---|---|
| ENERGY SOURCE | CONDUCT ELECTRICITY | CHARGE ELECTRICITY |
| DEVELOPMENT KNOWLEDGE 2 | REALIZATION FEATURE 4 | DEVELOPMENT KNOWLEDGE 3 |

DEVELOPMENT KNOWLEDGE 3

| FUNCTION 8 | FUNCTION 9 |
|---|---|
| DISCHARGE ELECTRICITY | CHARGE CHARGES |
| REALIZATION FEATURE 5 | REALIZATION FEATURE 6 |

DEVELOPMENT KNOWLEDGE 2

| FUNCTION 5 | FUNCTION 6 | FUNCTION 7 |
|---|---|---|
| BRING AC 100V INTO DERECT CURRENT | CONDUCT ELECTRICITY | TRANSFORM ELECTRICITY |
| REALIZATION FEATURE 1 | REALIZATION FEATURE 2 | REALIZATION FEATURE 3 |

REALIZATION FEATURE 6

| VIEW | CHARGE |
|---|---|
| INDIVIDUAL | DRUM |

REALIZATION FEATURE 5

| VIEW | DISCHARGE |
|---|---|
| INDIVIDUAL | MAIN CHERGER |

REALIZATION FEATURE 4

| VIEW | CURRENT |
|---|---|
| INDIVIDUAL | MAIN TRANSFORMER, MAIN CHARGER, WIRE 4,5 |

REALIZATION FEATURE 3

| VIEW | CURRENT |
|---|---|
| INDIVIDUAL | MAIN TRANSFORMER |

REALIZATION FEATURE 2

| VIEW | CURRENT |
|---|---|
| INDIVIDUAL | MAIN TRANSFORMER, POWER TRANSFORMER, SW, WIRE 1,2,3 |

REALIZATION FEATURE 1

| VIEW | CURRENT |
|---|---|
| INDIVIDUAL | POWER TRANSFORMER |

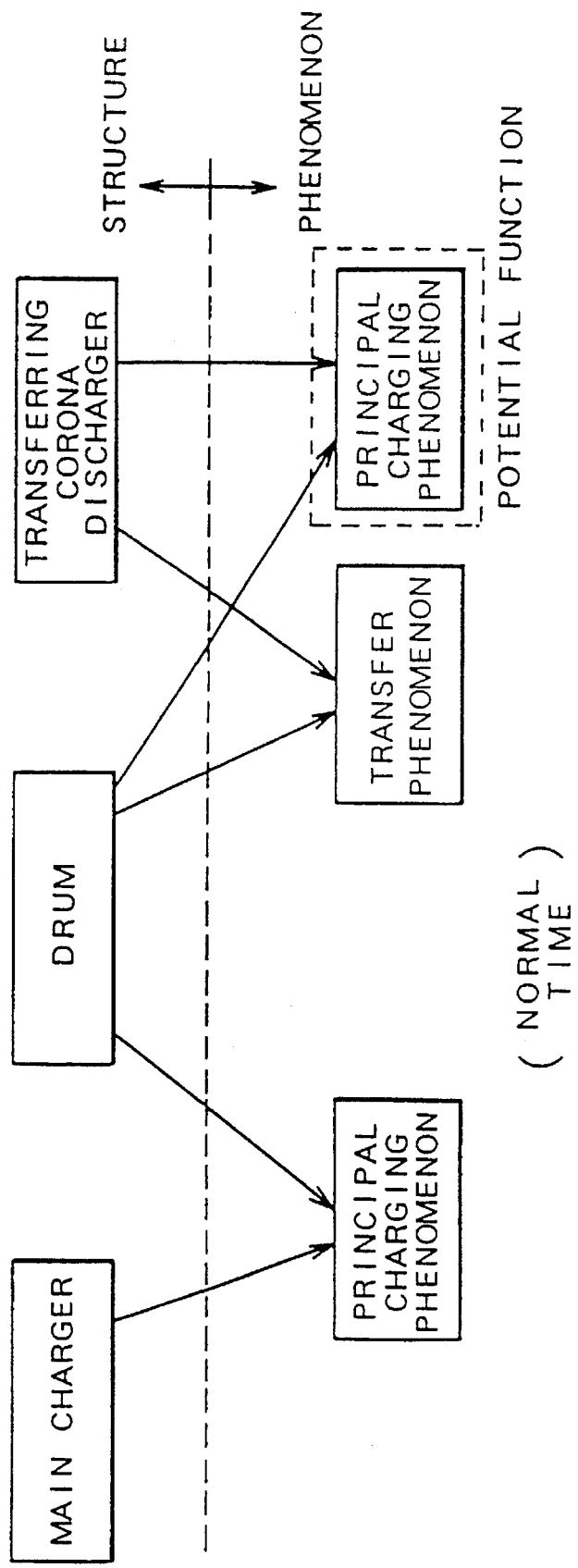

FIG. 28

(NORMAL TIME)

| PARAMETER \ TIME | TIME 0 | TIME 1 | TIME 2 | TIME 3 | TIME 4 |
|---|---|---|---|---|---|
| MC MODE | | ON | | | |
| HI MODE | | | ON | | |
| Dev MODE | | | | ON | |
| TC MODE | | | | | ON |
| DRUM ANGLE | | A 0 | A 1 | A 2 | A 3 |
| CHARGING QUANTITY OF DRUM | NOTHING | NOTHING ↓ FULL | FULL ↓ EXPOSED | | |
| DRUM TONER DENSITY | NOTHING | | | NOTHING ↓ FULL | FULL |
| PHENOMENON ⇒ | INITIAL | PRINCIPAL CHARGING | EXPOSURE | DEVELOPMENT | TRANSFER |

REQUIRED BEHAVIOR

FIG. 31

(METHOD 3)

| PARAMETER \ TIME | TIME 0 | TIME 1 | | TIME 4 |
|---|---|---|---|---|
| M̶C̶ ̶M̶O̶D̶E̶ | | | FROM PHENOMENON KNOWLEDGE OF DEVELOPMENT | |
| H I MODE | | | | |
| D ev MODE | | | O N | |
| T C MODE | | O N | | O N |
| DRUM ANGLE | | A 3 | A 2 | A 3 |
| CHARGING QUANTITY OF DRUM | NOTHING | NOTHING ↓ FULL | EXPOSED | |
| DRUM TONER DENSITY | NOTHING | | ? ↓ FULL | FULL |
| PHENOMENON ⇒ | INITIAL | PRINCIPAL CHARGING | DEVELOPMENT | TRANSFER |

PHENOMENON KNOWLEDGE
• DEVELOPMENT
  CONDITION
    • D ev MODE = O N
    • DRUM ANGLE = A 2
    • DRUM CHARGE = Exposed
  EFFECT
    • DRUM TONER → FULL

FIG. 32

| PARAMETER \ TIME | TIME 0 | TIME 1 | TIME 2 | TIME 3 | TIME 4 |
|---|---|---|---|---|---|
| ~~MC MODE~~ | | | | | |
| HI MODE | | | ON | | |
| Dev MODE | | | | ON | |
| TC MODE | | ON | | | ON |
| DRUM ANGLE | | A3 | A1 | A2 | A3 |
| CHARGING QUANTITY OF DRUM | NOTHING | NOTHING ↓ FULL | FULL ↓ EXPOSED | | |
| DRUM TONER DENSITY | NOTHING | | | NOTHING ↓ FULL | FULL |
| PHENOMENON ⇒ | INITIAL | PRINCIPAL CHARGING | EXPOSURE | DEVELOPMENT | TRANSFER |

REQUIRED BEHAVIOR ←

FUNCTIONAL REDUNDANCY CONTROL SYSTEM

This application is a continuation of application Ser. No. 07/989,511, filed Dec. 11, 1992, abandoned, which application is entirely incorporated herein by reference.

BACKGROUND OF THE INVENTION

1. Field of the Invention

The present invention relates generally to a redundancy control system, and more particularly, to a machine or an apparatus comprising a functional redundancy control system.

"Functional redundancy" means "using a part which originally exists in an apparatus and making use of the part utilizing a potential function of the part as a substitute for another part".

2. Background of the Invention

At the present time machine civilization advances, failures in an apparatus system exert very great effects on society. Accordingly, various types of maintenance have been performed on the apparatus system.

The following three means have been generally considered for the maintenance on the apparatus system. Specifically:

1. High-reliability design: making such design so that no fault occurs in the apparatus system.

2. Preventive maintenance: preventing a fault from occurring in the apparatus system during the use.

3. Corrective maintenance: preventing, even if a fault occurs in the apparatus system, the fault from affecting the whole apparatus system to recover its function in a short period of time.

However, there are limitations of such concepts. First, as for the high-reliability design, there is a physical limitation of increase in quality of parts, and the cost of the apparatus is liable to suddenly rise. In addition, in considering redundant design for ensuring the reliability, the sudden rise in cost due to the size of the system cannot be ignored. Furthermore, in considering a fault tolerant design or as to preventive maintenance, fault expectation ability must be present. However, it is difficult to expect the fault as the apparatus system is complicated.

On the other hand, if the effect of the failures in the apparatus system is considered, it is actually very dangerous to consider only fail-safe and corrective maintenance.

Therefore, it is necessary to positively recognize the possibility that a fault occurs and consider measures taken to prevent, even if a fault occurs, the fault from exerting a functional effect.

DESCRIPTION OF THE PRIOR ART

As one of the measures taken to prevent, when a fault occurs, the fault from exerting a functional effect, it has been known that a redundancy system is provided to an apparatus.

The most common redundancy system is to prepare excess means having the same function, and this redundancy system is for the purpose of increasing the reliability of the whole apparatus. The redundancy system is actually realized by arranging a plurality of parts of the same type in parallel, which shall be referred to as "part redundancy". One example of the part redundancy is disclosed in, for example, Japanese Patent Laid-Open Gazette No. 11520/1988. The part redundancy is effective in which the larger the number of parts arranged in parallel is, the higher the reliability becomes. As a result, the weight and the cost of an apparatus system are increased. In addition, the apparatus system may, in some cases, be inversely complicated, thereby causing the reliability to be decreased.

Japanese Patent Laid-Open Gazette No. 110601/1990 discloses as another redundancy system a control system referred to as "coordination dispersion". A coordination dispersion control system disclosed in this gazette is a system in which when a fault occurs in a certain control device, a subsystem of a plant controlled by the control device is assigned so as to be placed under control of another suitable control device. Specifically, in a case where a system has a plurality of control devices, if a fault occurs in a certain control device, a task related to the control device which fails is assigned to the other control device in accordance with a predetermined sharing rule so that control carried out by the control device which fails is shared with the other control device. This coordination dispersion control system is effective as a redundancy system for a control device in a system comprising a plurality of control devices, but cannot be a redundancy system for apparatus parts controlled by the control device, that is, an apparatus system itself.

As described in the foregoing, the "part redundancy" out of the conventional redundancy systems is a redundancy system for an apparatus system itself (controlled parts). However, the "part redundancy" requires parts to be arranged in parallel so as to realize the redundancy system in addition to parts inherently required, so that it has several disadvantages. For example, the cost is increased, the weight is increased, and the construction becomes complicated. In addition, the "coordination dispersion" is a redundancy system for a control device and cannot be applied to a controlled device.

SUMMARY OF THE INVENTION

The present invention has been made from a point of view which is entirely different from the conventional redundancy system, and provides an image forming apparatus having a redundancy system based on a new concept of a functional redundancy system. That is, the present invention is completed on the basis of a new concept of designing such an apparatus as to make, even if a fault occurs, self-repair of the fault so that its function can be automatically recovered by reconstructing the structure in any method, that is, using functional redundancy.

An object of the present invention is to realize a so-called "softly broken apparatus" by constructing a self-repair apparatus based on functional redundancy.

The present invention provides an apparatus system comprising a functional redundancy system, which is characterized by comprising a plurality of function developing means, each of the function developing means being able to develop a predetermined function inherently required, retrieving means for retrieving, with respect to the plurality of function developing means, the presence or absence and the contents of a function which is different from the function inherently required and which each of the function developing means does not ordinarily develop but potentially has, and control means for developing a potential function retrieved by the retrieving means as required.

In the present invention, more redundancy can be given to an apparatus by increasing the minimum number of parts required using a potential function of a part which inherently performs another function by changing the configuration of a system at the time of occurrence of a fault. Specifically, when a fault occurs in an apparatus system, a lost function is recovered by utilizing a part which originally exists in the apparatus system and utilizing the existing part as a substitute for the part which fails. Such a concept is one type of stand-by redundancy in a functional sense. However, such a concept is new in that it has not any substitutes for the part which fails and utilizes a part inherently used for another purpose is utilized, and is a redundancy system which has not been conventionally known.

According to the present invention, the functional redundancy system is added to the apparatus system, thereby to make it possible to automatically recover the function by reconstructing the structure in any method even if a fault occurs. Therefore, it is possible to realize a so-called "softly broken apparatus", and to provide an apparatus system which is not functionally affected even if a fault occurs.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 23 is a diagram showing the contents of knowledge related to a function "charge" of a photosensitive drum and development knowledges;

FIG. 24 is a diagram for explaining structures and phenomena at the normal time of an objective model;

FIG. 28 is a diagram showing a qualitative timing chart at the normal time in an image forming mechanism;

FIG. 31 is a diagram for explaining a method of forming a qualitative sequence at the time of occurrence of a fault; and FIG. 32 is a diagram showing a qualitative timing chart at the time of occurrence of a fault in an image forming mechanism.

DESCRIPTION OF THE PREFERRED EMBODIMENTS

1. Concept of "functional redundancy" and outline of self-repair apparatus using functional redundancy.

In this term, description is now made of the concept of "functional redundancy" in the present invention as well as an FBS diagram required to represent functional redundancy of an apparatus and utilize the same. In addition, description is made of a design method for giving functional redundancy to an apparatus and the outline of a self-repair apparatus having functional redundancy.

1-1. Definition of "functional redundancy"

"Functional redundancy" means making it possible to make use of a part which originally exists in an apparatus system utilizing a potential function of the part as a substitute for another part.

For example, an automobile with a manual transmission usually runs by engine power. When the engine is not operated, however, the automobile can move by a starting motor. This is an example in which redundancy is given without increasing the number of parts by altering the structure of a driving system to cause the starting motor to develop a potential function "move the body of an automobile" and cause the engine to develop a potential function "transmit a driving force".

Figure 1A:
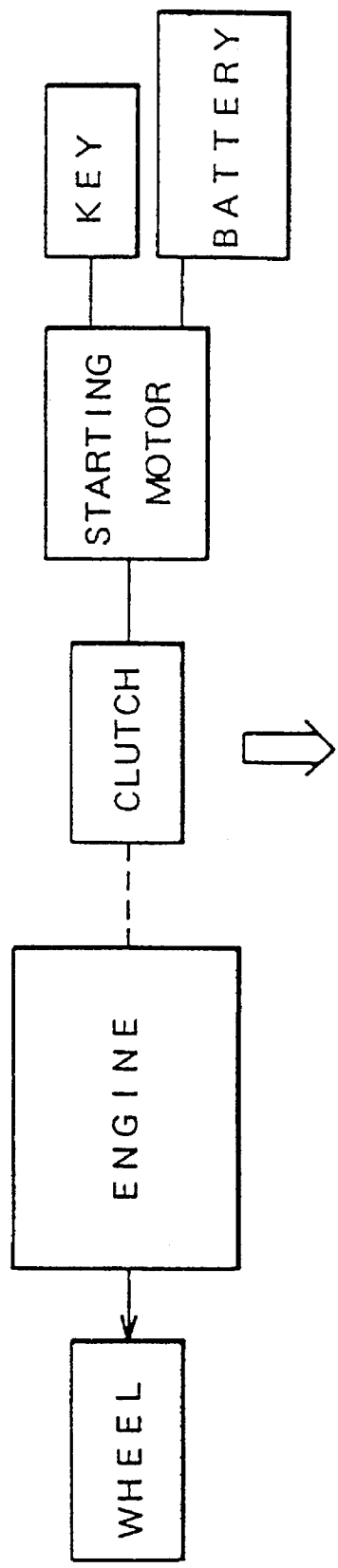
FIG. 1 is an illustration for explaining the definition of "functional redundancy" taking as an example a driving system of an automobile.
Figure 1B:
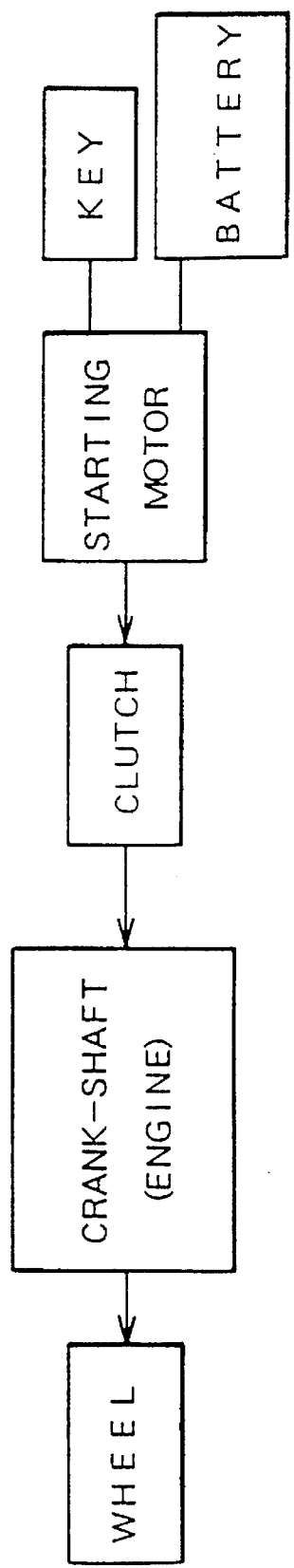

Specifically, redundancy is given without increasing the number of parts by changing the construction shown in FIG. 1 (a) to the construction shown in FIG. 1 (b) in which a starting motor is a driving source for "moving the body of an automobile" and a crank-shaft for "transmitting a driving force" is utilized as the engine.

In this specification, thus giving redundancy utilizing a potential function is defined as "functional redundancy".

If the functional redundancy is compared with the conventional part redundancy, they respectively have characteristics and problems, as shown in Table 1.

TABLE 1

Part Redundancy and Functional Redundancy

| Part redundancy | |
| --- | --- |
| Characteristics | Such "attribute maintenance" that a faulty attribute is replaced with the attribute of a redundant part. The reliability of a particular area is surely increased. Design and reliability prediction are easy. |
| Problems | Weight and cost are increased. It corresponds to only a fault predicted at the time of design. The reliability may be decreased by an increased complexity in an apparatus. |
| Functional redundancy | |
| Characteristics | Such "functional maintenance" that a lost function is replaced with a part performing another function. More redundancy can be added by increasing the minimum number of parts required. It corresponds flexibly to a fault by considering redundancy at a functional level. |
| Problems | It corresponds to various faults including an unexpected fault. The apparatus does not hard fail. A design method and a method of reliability prediction are not arranged yet. Necessity of function judgment and value judgment. |

"Necessity of function judgment and value judgment" listed as a problem of the functional redundancy in Table 1 is as follows: In general, it is not necessarily easy to completely recover a lost function A by a functional redundancy system. However, it is possible to enhance the lost function A to some extent.

For example, in the above described example of the automobile, the automobile only develops a speed of at most 5 km/h when it runs by the starting motor. Accordingly, a function of running at high speed is not performed. In addition, there is a significant restriction on the running time by the starting motor.

In recovering the lost function A, however, judgment whether or not a user can be satisfied with the degree to which the function is developed depending on the functional redundancy system depends on the use conditions and is determined by the value judgment of a human being. In the above described example of the automobile, there is a concept that a user can be satisfied with such function development by considering that the running speed is not so much a problem provided that the automobile can run to a gas stand or an auto repair shop. Alternatively, there is also a concept that a user cannot be satisfied with such function development.

The above described value judgment is distinguished from the essence of the present invention, which shall be determined by a dialogue with a user.

The functional redundancy according to the present invention is particularly useful for an apparatus whose operation is controlled by a computer such as a mechatoronics machine. The reason for this is that in an apparatus whose operation is controlled by a computer, the construction of the apparatus can be altered by altering a control pattern on software, thereby to make it sufficiently possible to add a functional redundancy system to the apparatus.

The present invention is so adapted, as one example, that a designer previously establishes a functional redundancy system and a method of changing the structure thereof in an apparatus system at the time of designing the apparatus system and utilizes this functional redundancy system depending on the circumstances of a fault in the apparatus system.

1-2. Object representing method for representing function: FBS diagram

In order to construct an apparatus system having a functional redundancy system incorporated therein, that is, a functional redundancy apparatus system, an apparatus must be represented in the form including functions.

In the present invention, an apparatus is represented by an FBS (Function-Behavior-State) diagram. Specifically, the apparatus is represented by a diagram comprising functions, behaviors and states. The behaviors and the states are represented on the basis of the qualitative process theory by K. D. Forbus. This point will be described in detail later.

The FBS diagram will be first outlined and then, the representation of the functional redundancy apparatus on the FBS diagram will be described.

1-2-1. Definition of FBS diagram

Consideration is given to only the physical world, to define states, behaviors and functions constituting the FBS diagram as follows:

First, states S of a certain apparatus are expressed as the following equation (1) using internal states $S_i$ of the apparatus and external states $S_o$ such as an environment:

$$S = <S_i, S_o> \quad (1)$$

The equation (1) means that a set of states S is described by sets of states $S_i$ and $S_o$.

Furthermore, the internal states $S_i$ are defined as the following equation (2) using a set of substances E representing parts and the like in the apparatus, a set of attributes of substances A representing the size of a gear, a resistance value of a resistor and the like, a set of relationships R representing the connection among parts, the relationship among attributes and the like:

$$S_i = <E, A, R> \quad (2)$$

The external states $S_o$ are described in the same manner as the internal states. In addition, a so-called "structure" of the apparatus is considered as one type of state of the apparatus where the duration is long and is described as a part of the internal states $S_i$. This is for making it possible to flexibly describe the change in the structure itself which may occur due to a fault in the apparatus.

Figure 2:
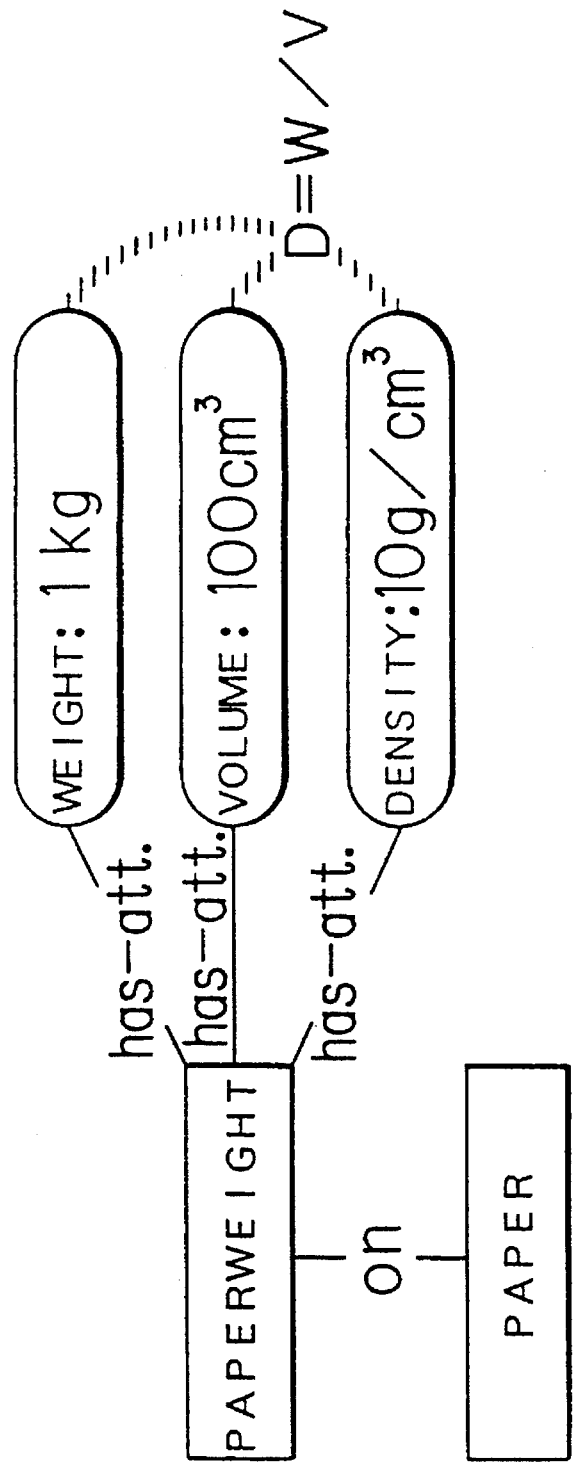
FIG. 2 is a diagram showing, as one example of state description in an FBS diagram, the state description of a paperweight.

One example of state description defined by the equations (1) and (2) is shown in FIG. 2. FIG. 2 shows the state description of a paperweight. In FIG. 2, the paperweight is placed on paper, parameters representing states such as the weight W, the volume V and the density D exist in the paperweight, and there is a relationship D=W/V among the parameters.

Behaviors B are then defined as "change of one or more states (including no change)" using the above described states S. This definition is expressed by the following equations (3), (4) and (5):

$$b = s_1 \rightarrow s_2 \rightarrow \ldots \quad (3)$$

$$b \in B \quad (4)$$

$$s_1, s_2, \ldots \in S \quad (5)$$

Specifically, each of behaviors b included in a set of behaviors B is changed in state, for example, $s_1 \rightarrow s_2 \rightarrow \ldots$, and respective states $s_1, s_2, \ldots$ obtained by the change are included in the states S.

It should be noted that it can be considered that the "change of state" is not brought about at random but brought about by a "physical law". A concept that the states S and the behaviors B are thus combined with each other by a physical law is one basic concept of the present invention. Conversely, a knowledge base of a physical law is constructed, thereby to make it possible to manage noncontradiction between the state representation and the behavior representation of an apparatus system by a computer.

On the basis of the foregoing, a function F is then defined as "description of behaviors recognized and abstracted for a certain purpose by a human being". That is, the function is basically described in the form of "make+an object+an objective complement". The definition of this function F is expressed by the following equation (6):

$$\Gamma_{ab}: B \rightarrow F \quad (6)$$

In the equation (6), $\Gamma_{ab}$ indicates the process of recognition and abstraction by a human being, and the behaviors B are converted into the function F through the process.

The relationship between functions and behaviors depends on a human subjective point of view. Another basic concept of the present invention is that many functions can correspond to the same behavior, or vice versa depending on the point of view.

For example, if an electrophotographic copying machine is taken as an example, a plurality of behaviors such as a behavior "light from a neutralization lamp is irradiated on a photosensitive drum so that electrostatic charges are grounded" and a behavior "electrostatic charges on a photosensitive drum are canceled by a discharge phenomenon of a charger" may correspond to a function "remove charges on a photosensitive drum". Such a many-to-many correspondence between functions and behaviors is a basis for making the concept of functional redundancy possible, and an FBS diagram clearly representing the many-to-many correspondence is a prerequisite indispensable to the functional redundancy.

Figure 3:
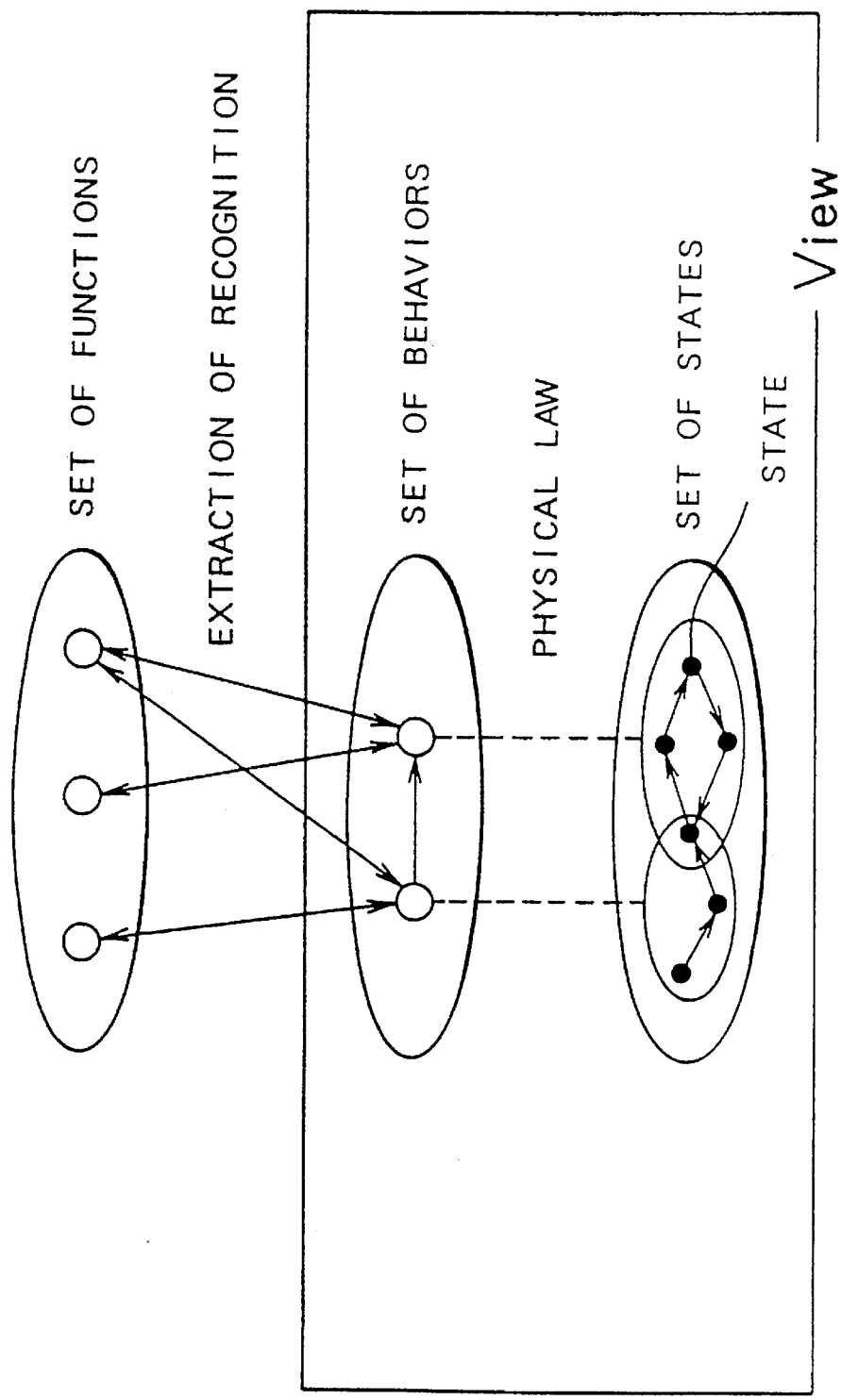
FIG. 3 is a diagram showing the relationship among functions, behaviors and states in an FBS diagram.

The above described relationship among functions, behaviors and states in the FBS diagram is shown in FIG. 3. In FIG. 3, a set of states and a set of behaviors are combined with each other by a physical law, and the set of behaviors and a set of functions correspond to each other by extraction of recognition.

1-2-2. Realization of FBS diagram

Description is now made of a method of realizing the FBS diagram, that is, a method of describing functions, behaviors and states described in the item 1-2-1.

1-2-2-1. Function representation

"Function" defined in the item 1-2-1. is described by a frame "function knowledge" shown in Table 2.

This function knowledge is collected on the basis of judgments of a designer and an engineer, to constitute a function knowledge database.

TABLE 2

Data Structure of Function Knowledge

| item | content |
| --- | --- |
| function name | label representing function |
| realization feature | physical feature realizing the function |
| development knowledge | set of development knowledges |

As shown in Table 2, the "function knowledge" is described by the following items:

"Function name": It is a label representing the function, which is described in the form of "an object (which may be plural)+a verb"

"Realization feature": A physical feature for realizing the function is described in this item. As described later in the item "1-2-2-2. Behavior and State Representation", the physical feature is knowledge which is a combination of behaviors and states frequently appearing in an apparatus and defines the relationship between "function" and "behavior" previously defined. In general, if a plurality of realization features corresponding to the function described exist, the plurality of features are described. On the other hand, if no realization features exist, no features are described.

"Development knowledge": It is knowledge representing a developing method for developing the function. In the item of "development knowledge", a set of development knowledges is described. One function knowledge may, in some cases, have several different development knowledges.

A function of an apparatus is generally developed into several partial functions and observed. For example, it is considered that a function of an electrophotographic copying machine "make copies" is realized by combining a function of reading an image, a function of holding the image read, a function of developing the image, a function of transferring the image developed, a function of fixing the image transferred, and the like. In addition, the function of reading an image is constituted by a function of scanning an original, a function serving as a light source, and the like. The partial functions generally constitute a functional hierarchical structure.

In the present invention, therefore, function knowledge shall have a development knowledge describing a method of developing the function.

Table 3 shows items describing the development knowledge.

TABLE 3

Development Knowledge

| item | content |
|---|---|
| development knowledge name | name |
| partial function | network representing functional hierarchical structure in which certain function is developed |

The contents of the items in Table 3 are as follows:

"Development knowledge name": It is a label representing the development knowledge.

"Partial function": A method for developing a certain function is described.

1-2-2-2. Behavior and state representation

The behavior and state representation in the present invention is based on the qualitative process theory by K. D. Forbus, as described above.

In the qualitative process theory, the physical world is described with a "physical phenomenon" as a unit. A physical behavior and a physical state are described by a basic frame, that is, an individual, an individual view, and a process view.

The individual corresponds to a substance described in the item 1-2-1-1. and is a label representing an object which exists in the apparatus. For example, in the example shown in FIG. 2, the paperweight and the paper are individuals.

The individual view describes the states of an individual and the relationship among individuals. For example, in the example shown in FIG. 2, the individual view describes the presence of parameters representing states such as the weight W, the volume V and the density D in the paperweight, and the relationship of D=W/V among the parameters.

The process view describes a physical phenomenon occurring on the state description constituted by the individual and the individual view. For example, the free drop motion, the discharge phenomenon and the like are respectively process views. The individual view and the process view are described by the occurrence condition and the effect after the occurrence.

The individual, the individual view and the process view shall be generally referred to as a "view" in this specification.

A physical feature is knowledge which is a combination of phenomena frequently appearing at the design time and the maintenance time. One physical feature is represented and named as a network of the above described view.

In the present invention, a physical feature database collected on the basis of physical experience is utilized. Corresponding behaviors shall be described as a realization feature in function knowledges which can correspond to a feature in this database out of the above described function knowledges, while no realization feature shall be described in function knowledges which do not correspond thereto.

Figure 4:
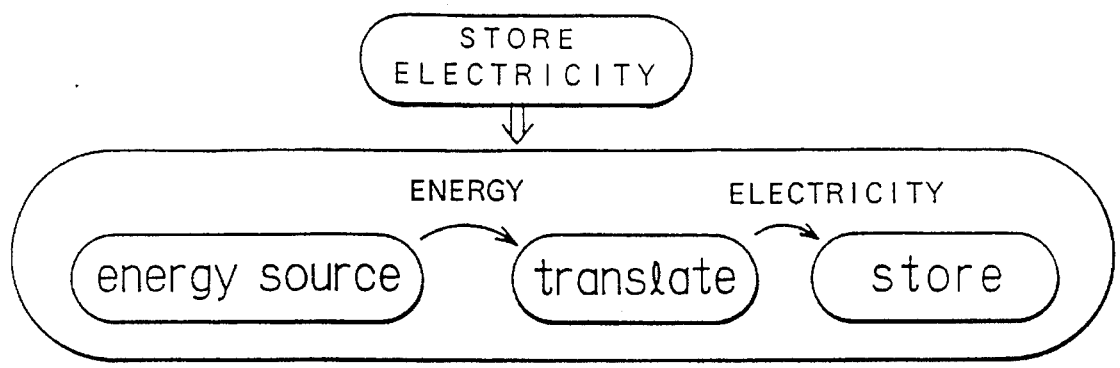
FIG. 4 is a diagram showing a method of writing development knowledge for a function "store electricity"

A concrete example of writing will be described with reference to FIGS. 4 and 5. FIG. 4 shows development knowledges of a function "store electricity". The development knowledges are so constructed that energy is outputted by a function "energy source", energy is translated into electricity by a function "translate", and electricity is stored by a function "store".

Figure 5:
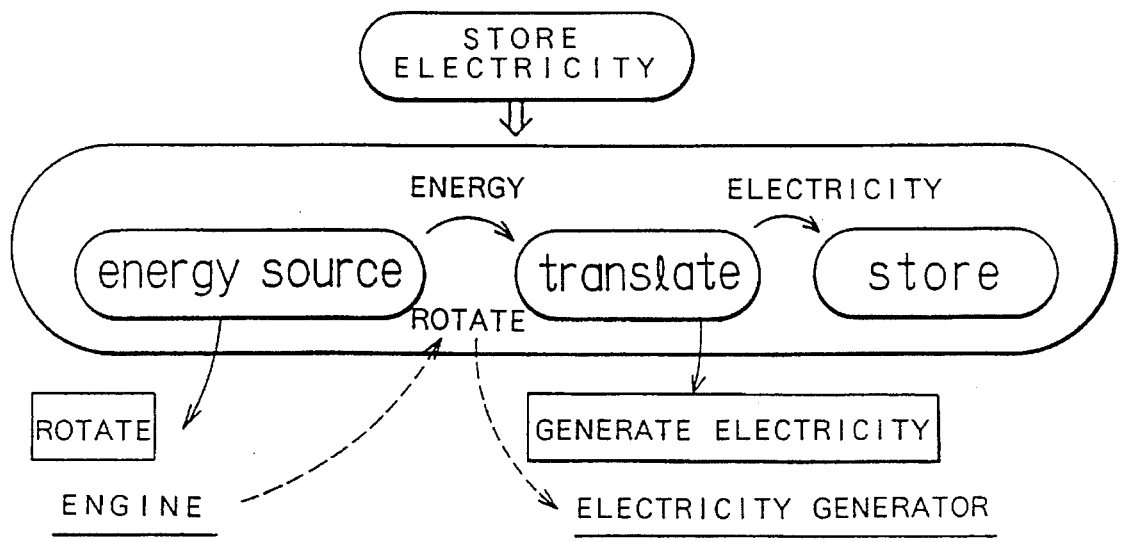
FIG. 5 is a diagram showing method of writing a function knowledge "store electricity" in a substantiated manner.

If the development knowledges shown in FIG. 4 are previously prepared, it is determined that the function "energy source" is realized by a rotation phenomenon of an engine, and a physical feature for realizing each partial function is selected, a functional hierarchy shown in FIG. 4 is substantiated as shown in FIG. 5. Specifically, the function "energy source" is realized by an engine, and the function "translate" is realized by an electricity generator.

1-2-2-3. Description of Object

On the FBS diagram, a model M of an apparatus is defined as the following equation (7) using a hierarchical structure network $n_f$ at a functional level, a view network $n_{bs}$ at a behavior and state level, and a set of relationships $R_{fb}$ between functions and behaviors.

$$M = <n_f, n_{bs}, R_{fb}> \quad (7)$$

The relationships $R_{fb}$ between functions and behaviors relate a function node to a feature realizing the function node.

The hierarchical structure network $n_f$ and the prototype network $n_{bs}$ are respectively defined as the following equations (8) and (9):

$$n_f = <F, R_f> \quad (8)$$

$$n_{bs} = <V, R_p, C> \quad (9)$$

As expressed by the equation (8), the function hierarchical network is constituted by function knowledges F and the relationship among the function knowledges $R_f$. $R_f$ is the order relationship among the development knowledges and the relationship having the same object at the same hierarchical level.

Furthermore, as expressed by the equation (9), the view network $n_{bs}$ at the behavior and state level is described by a set of views V, a set of dependent relationships among views $R_p$, and a set of boundary conditions C representing the conditions such as the on-off condition of a switch and the initial condition of the value of each parameter.

The following two types of information are further added to the representation of a certain apparatus based on the describing method.

"Holding condition tag": It must be generally judged whether or not a function having no realization feature holds. Therefore, the realization condition of the function in a certain object shall be written as a tag in a function node. As one example, a function "store electricity" in an automobile is developed when "power parameters of a battery are plus".

"Premise tag": An apparatus is provided with several switches for switching states. The state of the apparatus is changed by the switches. This is an operation mode. Adding a functional redundancy system is newly adding the operation mode to the apparatus. In this sense, the operation mode must be represented. In this case, inputs of the switches for switching the operation mode shall be affixed to the function node as a premise tag. When behavior simulation is done with respect to a certain functional mode, the contents of the tag are inputted as the initial condition.

1-2-2-4. Example of representation of actual apparatus using FBS diagram

Figure 6:
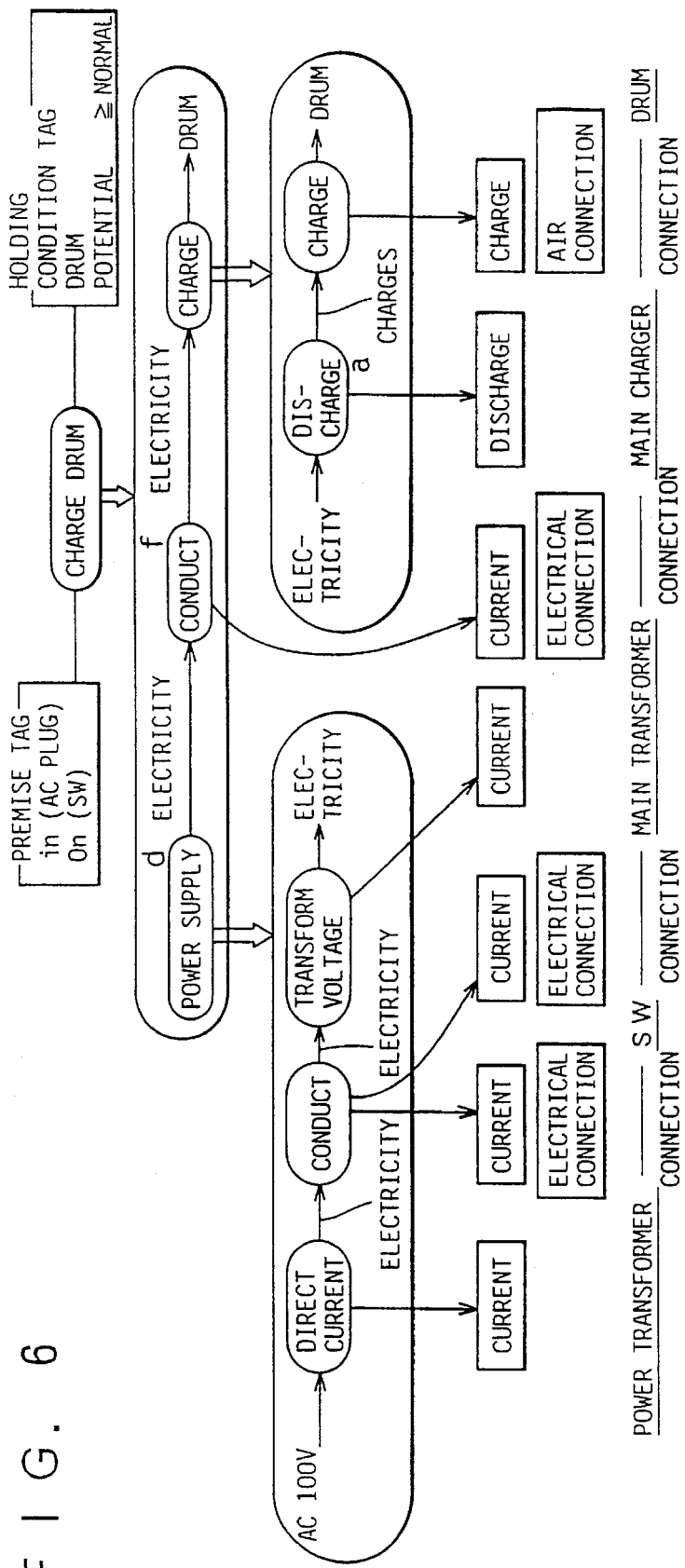
FIG. 6 is a diagram showing one example of an FBS diagram representing a function "charge" in an electrophotographic copying machine.

FIG. 6 shows an example in which a part of an actual apparatus is represented using an FBS diagram. FIG. 6 is an example of the FBS diagram representing a function "charge a photosensitive drum" realized by an electrophotographic copying machine.

1-2-3. Utilization of FBS diagram

As described in the foregoing, in an FBS diagram, an apparatus is represented by a hierarchical structure of a function understood by a human being and behaviors and states realizing the function, as shown in, for example, FIG. 6. Therefore, the FBS diagram has the following characteristics.

(1) The relationship between functions and behaviors is inherently in a many-to-many correspondence. However, the relationship can be clearly represented. Therefore, it is possible to represent functional redundancy on this representation.

(2) The representation of functions subjectively described and the representation of behaviors and states which can be physically and objectively described can be separated from each other. Therefore, the representation at a functional level can be flexibly described. On the other hand, the physical realizability and noncontradiction can be managed at a state level.

(3) An understanding of the apparatus by a human being or an image of the apparatus at the time of concept design are functional in many cases. Such functional representation can be directly described on a computer. Accordingly, the results of inference is easy to understand by a human being.

Furthermore, the FBS diagram is used in the design phase and the operation phase of a self-repair apparatus, thereby to obtain the following characteristics:

At the design time:

(1) It is possible to draw inference for adding functional redundancy in a functional hierarchy.

(2) It is possible to derive the physical realizability of a function which is being designed and the realizing method thereof in a behavior and state hierarchy.

At the operation time:

(1) At the time of occurrence of a fault, it is possible to know which function is lost on an objective apparatus and a functional redundancy system which can cope with the lost function.

(2) In the behavior and state hierarchy, it is possible to simulate the realizability, the repair operation and the like.

1-3. Construction of functional redundancy apparatus

A functional redundancy apparatus system is constructed in the following three stages:

(1) Determination of structure of design object

First, the structure of a design object is determined, the connection among parts, the arrangement relationship among parts and the like must be determined as the stage of concept design. At this time, an operation mode which can be taken by an apparatus is simultaneously determined. On the FBS diagram, the determination of the structure corresponds to noncontradictory and sufficient determination of a functional hierarchical structure and a network at a behavior and state level.

(2) Determination of abstract control sequence of objective apparatus

The boundary conditions of switches required to develop a function are found on the basis of the abstract structure determined in the item (1). An example is "When a photosensitive drum passes through a principal charging portion, the photosensitive drum must be principally charged". On the FBS diagram, this corresponds to arrangement of premise tags in the order of time such that the function of the whole apparatus can be developed.

(3) Determination of parameters

The quantitative values of parameters described in the abstract structure and control sequence of the apparatus determined in the items (1) and (2) are determined. Specifically, the size of the photosensitive drum, an output of the power supply and the like are determined.

The apparatus is constructed from the foregoing. However, the construction of the functional redundancy apparatus will be mainly described with respect to the item (1). The reason for this is that the stages described in the items (2) and (3) are carried out in the same manner as those in the general design, and the stage described in the item (1) in which functional redundancy is added is a stage which characterizes a method of constructing the apparatus.

Functional redundant design is made in the following manner using as an input a design object $m^0 = <n_f^0, n_{bf}^0, R_f^0>$ which is an ordinary apparatus whose concept design is terminated.

Figure 7:
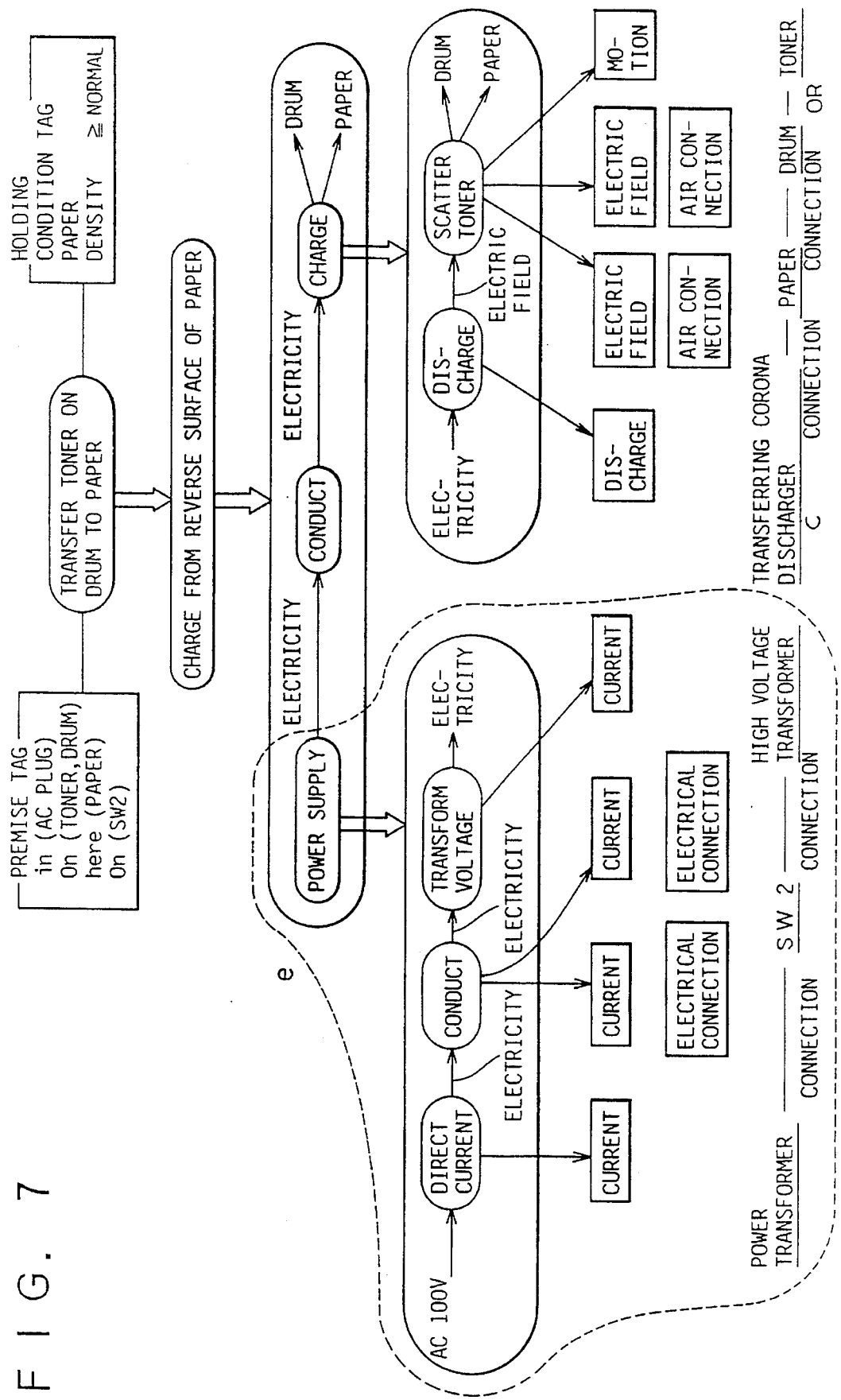
FIG. 7 is a diagram showing one example of an FBS diagram representing a function "transfer" in an electrophotographic copying machine.

As one example, FIG. 6 and a portion where a function "transfer" of an electrophotographic copying machine is realized, that is, an FBS diagram shown in FIG. 7 are used.

(1) Pay attention to a function $f^*$ of a design object to which redundancy is to be added and a functional structure $n_f^*$ A function "charge a drum" shown in FIG. 6 is paid attention to.

(2) Derive candidate for functional redundancy with respect to function paid attention to.

Candidates for functional redundancy are derived by combining the following four types of methods.

Figure 8:
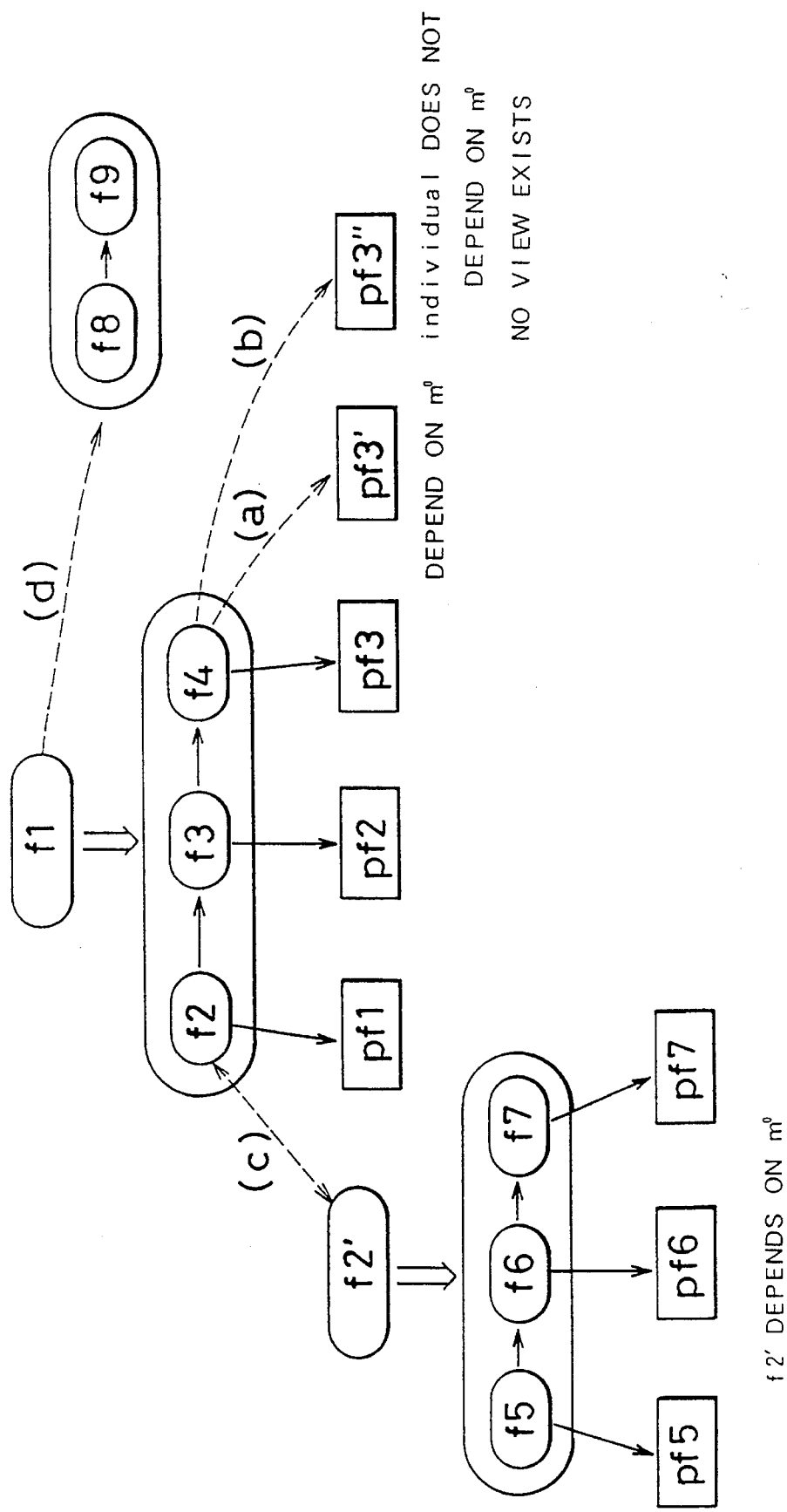
FIG. 8 is a diagram for explaining a method of deriving candidates for a functional redundancy system.

(a) Operation of FB (function-behavior) relationship (see FIG. 8 (a))

A new FB relationship is established by using the same functional hierarchical structure $n_f^*$ which is paid attention to and replacing a realization behavior of each partial function with another realization behavior of the "same type" which already exists in a model $m^0$ which is a design object. That is, a development feature of the partial function $n_{bs}^*$ is replaced with a feature $n_{bs}'$ which is in the same class but is in another instance.

In the example shown in FIG. 6, the above described replacement corresponds to the replacement of a function "discharge" indicated by a in FIG. 6 with a behavior "a discharge phenomenon on a transferring corona discharger" realizing the function "discharge" indicated by b in FIG. 7.

(b) Utilization of potential function (see FIG. 8 (b))

As in the above described item (a), the same functional hierarchical structure $n_f^*$ which is paid attention to is used, and each partial function is replaced with a potential function which can be performed by each individual in the objective model $m^0$. If an individual in a realization feature pf described in a function knowledge of a function f desired is within a behavior $n_{bs}^0$ of a design object, the individual may perform the function f as a potential function, whereby a set of f and pf becomes a candidate for functional redundancy.

In the example shown in FIG. 6, it is presumed that a transferring corona discharger indicated by c in FIG. 7 can develop a behavior "a current flows" with respect to, for example, a function "conduct electricity" in FIG. 6, that is, a function "conduct electricity" can be performed as a potential function, so that an attempt to substitute this transferring corona discharger for a function "conduct energy" is made.

(c) Operation of functional hierarchy (see FIG. 8 (c))

In a functional hierarchical structure which is paid attention to, a certain partial function is selected, and a function of the same type as the partial function is retrieved in a design object and substituted for the partial function.

In the example shown in FIG. 6, an attempt to substitute a portion subsequent to a function "generate energy" indicated by e in FIG. 7 for a function "generate energy" indicated by d in FIG. 6 is made.

(d) Construction of new functional hierarchy (see FIG. 8 (d))

In a functional hierarchical structure which is paid attention to, a function of a certain portion or the whole is paid attention to. Function knowledge of the function which is paid attention to may have a plurality of development knowledges. Therefore, development knowledges other than development knowledge currently used are utilized to newly construct a functional hierarchical structure, and the stages described in the items (a) to (c) are carried out with respect to each of new partial functions.

In the example shown in FIG. 6, a function "conduct electricity" indicated by f is developed, and three types of partial functions, that is, "translate electricity into rotation", "transmit rotation" and "translate rotation into electricity" are developed.

By the foregoing, candidates for functional redundancy are derived.

(3) Derive realization condition with respect to candidate for functional redundancy Behaviors and substances realizing the functional hierarchical structure obtained in the above described item (2) must be brought about on a design object. Specifically, such a noncontradictory design solution $m^R$ ($m^S \subset m^R$) as to include a portion of the model $m^s = <n_f^s, n_{bs}^s, \overline{R_{fb}^s}>$ derived in the item (2) must be constructed on the basis of the model $m^0$ which is a design object before improvement. $n_{bs}^0$ and $n_{bs}^s$ are compared with each other, thereby to make it possible to divide $n_{bs}^s$ into three parts, as shown in the following equation (10):

$$n_{bs}^s = n_{bs}^g \cup n_{bs}^i \cup n_{bs}^c \qquad (10)$$

$n_{bs}^g$ is a portion of a state realized on the design object (g is an abbreviation for "good"), $n_{bs}^i$ is a behavior which is not contradictory to the design object but does not satisfy the realization condition (i is an abbreviation for "inadequate"), and $n_{bs}^c$ is a portion of a state which is contradictory to the design object (c is an abbreviation for "conflict"). At this time, the realization of $n_{bs}^i$ is the condition for realizing this functional redundancy system, and contradiction between $n_{bs}^c$ and the design object is the condition of a switching mechanism which must be switched simultaneously with the switching of the inherent functional structure and functional redundancy system.

(4) Construction of apparatus satisfying realization condition

Concept design is made on the basis of the realization condition and the condition of the switching mechanism obtained in the above described item (3). The realization condition and the switching condition are individually fulfilled. Behavior simulation is done, to manage noncontradiction at a behavior and state level and inspect the realizability of a required function.

Figure 9:
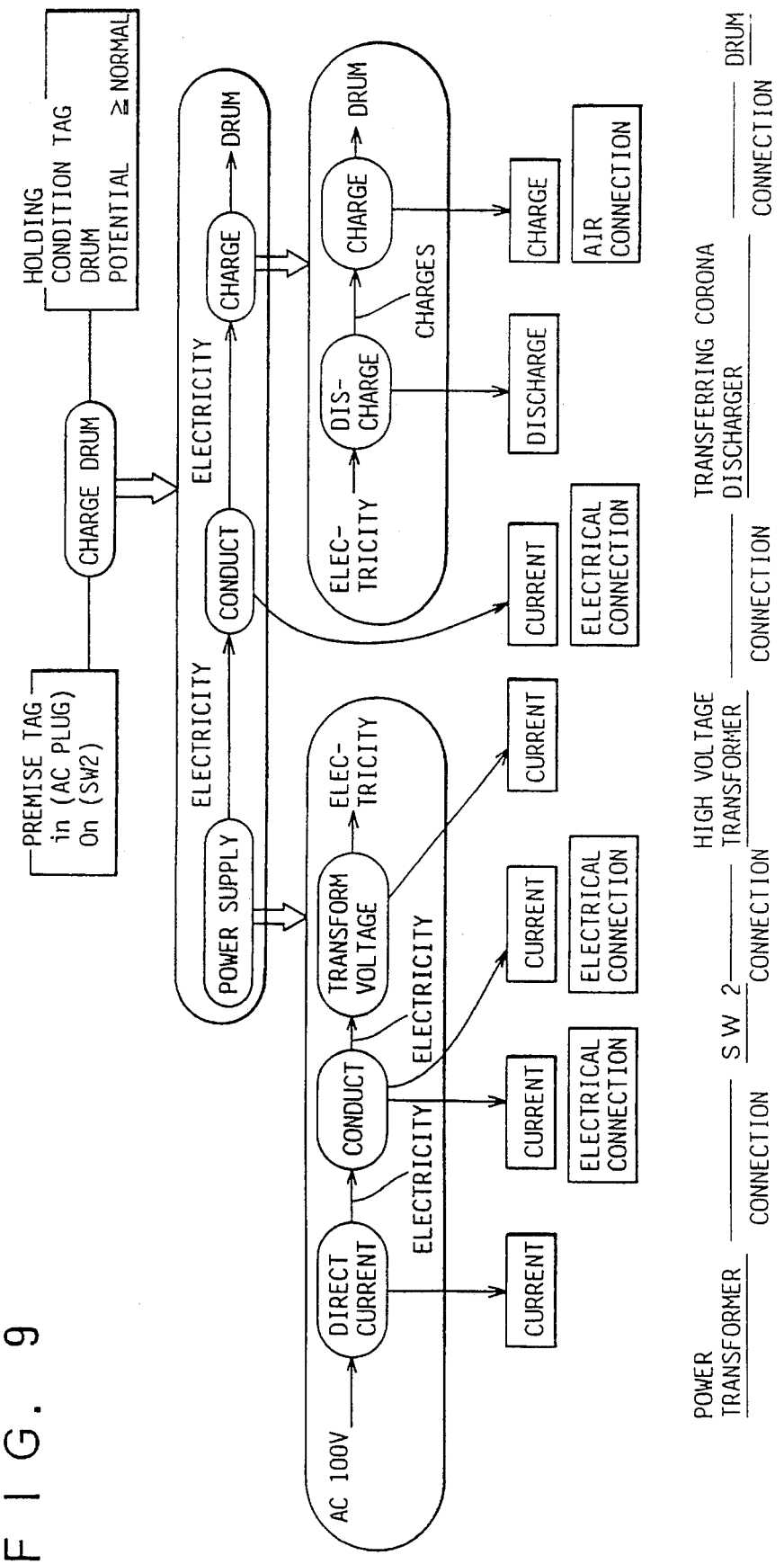
FIG. 9 is a FBS diagram showing an example of a functional redundant design solution related to a function "charge a drum" derived in accordance with the method shown in FIG. 8.

A functional redundancy system obtained as a result of the design in the concrete example taken up in FIGS. 6, 7 and 8 is shown in FIG. 9. In FIG. 9, the candidate described in the above described item (2) (a) is adopted, and an attempt to substitute the function indicated by h in FIG. 7 for the function indicated by a in FIG. 6 is made. In this case, a function "power supply" and a function "conduct electricity" shown in FIG. 7 are substituted for a function "power supply" and a function "conduct electricity" shown in FIG. 6, whereby this functional redundancy system is realized.

(5) Evaluation of candidate for functional redundancy

A candidate for functional redundancy to be adopted must be selected from a set of candidates for functional redundancy derived in the above described item (2).

In this case, the following two evaluation equations (11) and (12) are introduced:

$$\text{Redundancy}(f^*) = \frac{n(n_{bs}^R(f^*) \cap n_{bs}^0)}{n(n_{bs}^R(f^*))} \qquad (11)$$

$$\text{Robust}(f^*) = 1 - \frac{n(n_{bs}^R(f^*) \cap n_{bs}^0(f^*))}{n(n_{bs}^0(f^*))} \qquad (12)$$

In this case, Redundancy (f*) indicates the ratio of a portion to be added so as to realize a functional redundancy system (f*) which is paid attention to. It can be said that this Redundancy is more part redundant if it is close to 1, while being more functional redundant if it is close to 0. It is considered that the Redundancy (f*) is qualitatively proportional to the cost.

Furthermore, Robust (f*) indicates the degree at which a realization structure in the original design and a realization structure in the functional redundancy system do not coincide with each other with respect to the function f* which is paid attention to. It is considered that the higher this Robust (f*) is, the higher the operability of the functional redundancy system of the function f* which is paid attention to is in an objective system at the time of occurrence of a fault. It is considered that the Robust (f*) is qualitatively proportional to the reliability.

When a candidate for functional redundancy is selected, it is possible to select between one low in Redundancy (f*) or one high in Robust (f*). In either case, one candidate for functional redundancy shall be selected by the two evaluation equations. However, two evaluation parameters are not independent but are inversely proportional to each other.

Figure 10:
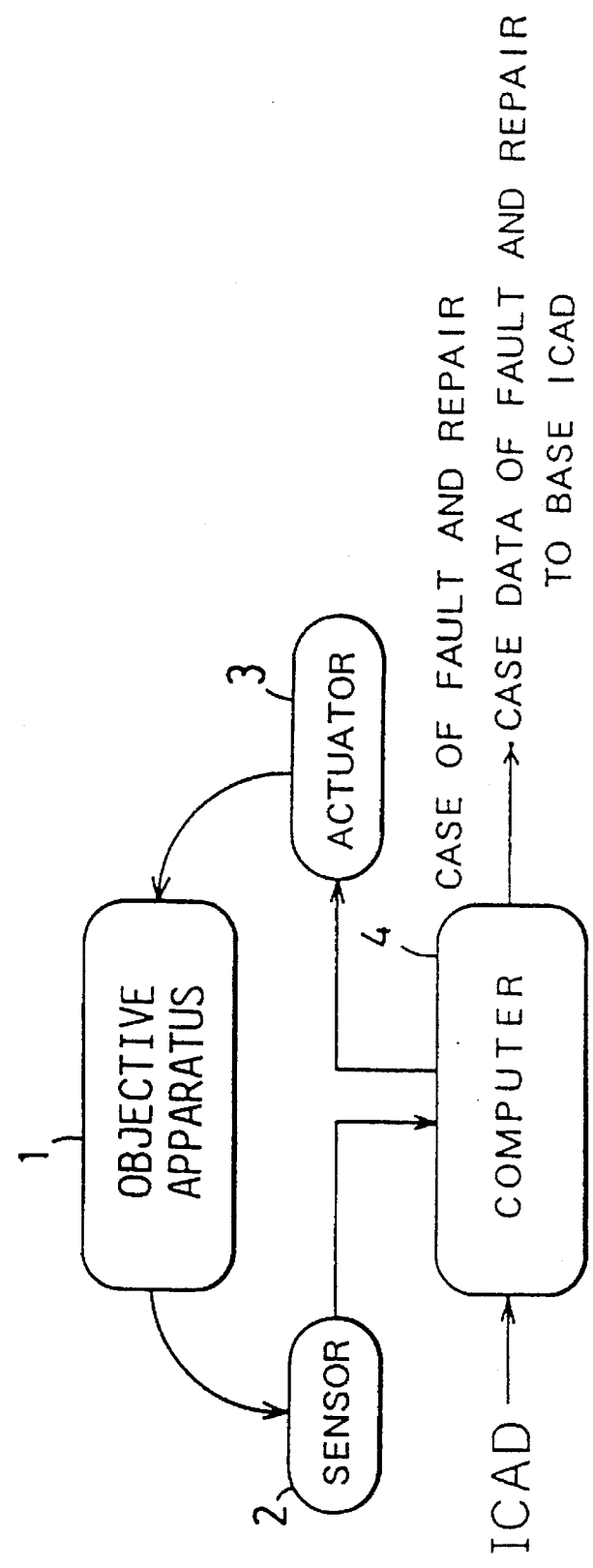
FIG. 10 is a block diagram showing the basic construction of a self-repair apparatus having a functional redundancy system added thereto.

2. Concrete example of self-repair apparatus having functional redundancy system added thereto 2-1. Basic construction FIG. 10 is a block diagram showing the basic construction of a self-repair apparatus having a functional redundancy system added thereto. As shown in FIG. 10, a computer 4 is connected to an objective apparatus 1 having a functional redundancy system through a sensor portion 2 for monitoring the state of the objective apparatus 1 and an actuator portion 3 for, for example, controlling a controller of the objective apparatus 1 and selecting between the two states of a switch. The computer 4 is basically equipped with a fault diagnosis/repair plan system disclosed in the specification of Japanese Patent Application No. 252191/1990 which is the prior application of the inventors of the present application. However, an objective model in the self-repair apparatus is one having a functional hierarchical network added to the frame of the substance model plus the parameter model in the above described prior application.

2-2. Concrete example using automobile as objective apparatus

Description is now made of one example of a specific apparatus having a functional redundancy system according to the present invention added thereto.

Figure 11:
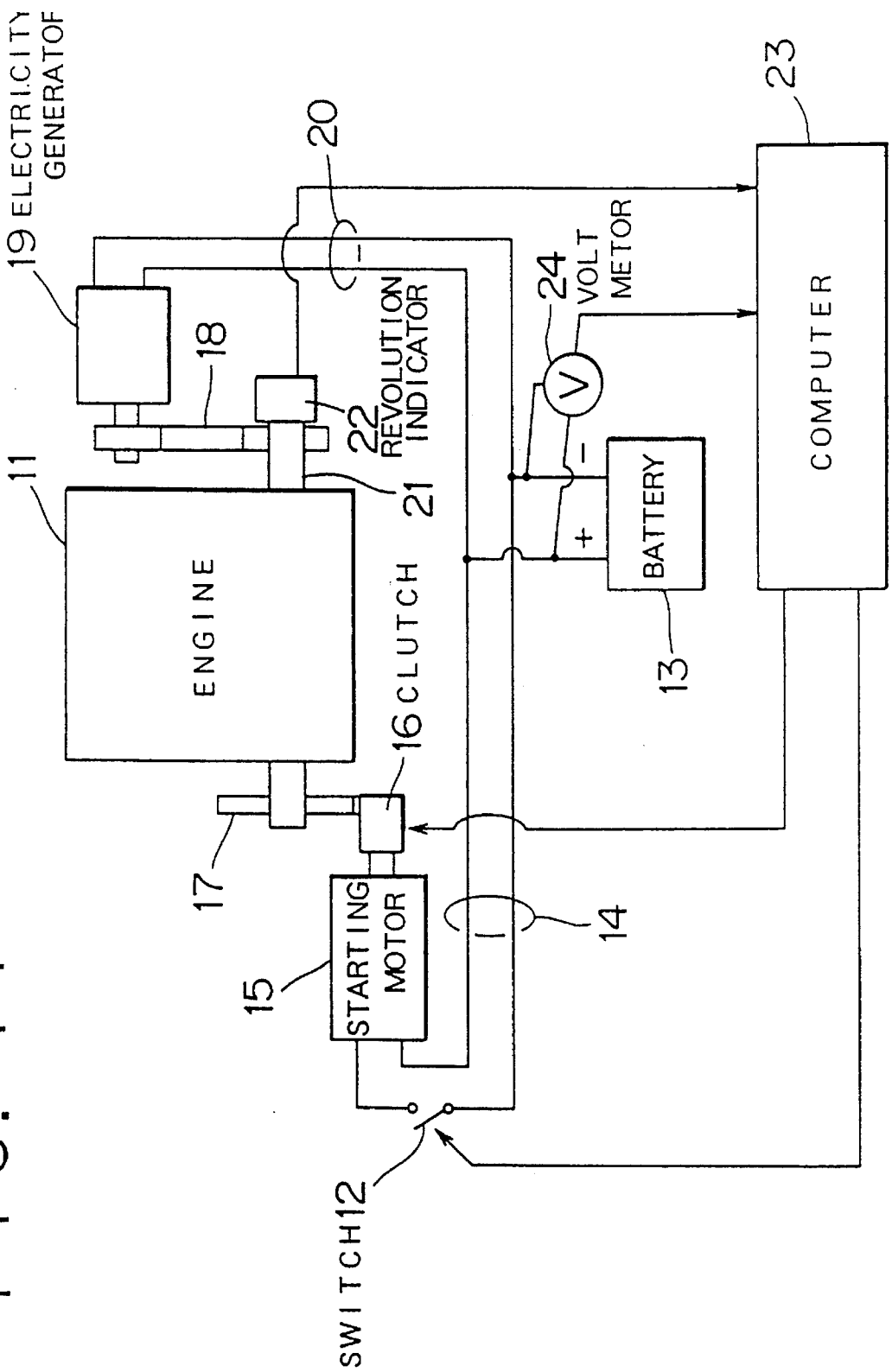
FIG. 11 is an illustration showing an energy transfer mechanism including an engine, an electricity generator, a battery and a starting motor of an automobile.

FIG. 11 is an illustration showing an energy transfer mechanism comprising an engine, an electricity generator, a battery and a starting motor of an automobile.

In the construction shown in FIG. 11, when an engine 11 is started, a switch 12 is turned on, so that electricity stored in a battery 13 is applied to a starting motor 15 through a conductor 14, to rotate the starting motor 15. A clutch 16 is engaged in synchronism with the rotation of the starting motor 15, whereby the torque of the starting motor 15 is transmitted to the engine 11 through the clutch 16 and a flywheel 17. Correspondingly, the engine 11 is rotated and the engine 11 is self-rotated.

The switch 12 is turned on only for a short time at the time of starting and then, is turned off, so that the supply of power to the starting motor 15 from the battery 13 is stopped, to stop the starting motor 15. In addition, the clutch 16 is disengaged from the flywheel 17 in synchronism with the stop.

When the engine 11 is normally rotated, the torque of the engine 11 is transmitted to an electricity generator 19 through a belt 18, to rotate the electricity generator 19. When the electricity generator 19 is rotated, electricity is generated. The electricity generated is applied to the battery 13 through a conductor 20, to charge the battery 13.

A revolution indicator(tachometer) 22 is connected to an axis of rotation 21 of the engine 11, and the number of revolutions indicated by the revolution indicator 22 is inputted on demand to a computer 23. In addition, a volt meter 24 is connected to the battery 13, and a charging voltage of the battery 13 is detected by the volt meter 24. The voltage detected by the volt meter 24 is applied to the computer 23.

The computer 23 controls the clutch 16 and the switch 12 when the functional redundancy system is developed, as described later.

Figure 12:
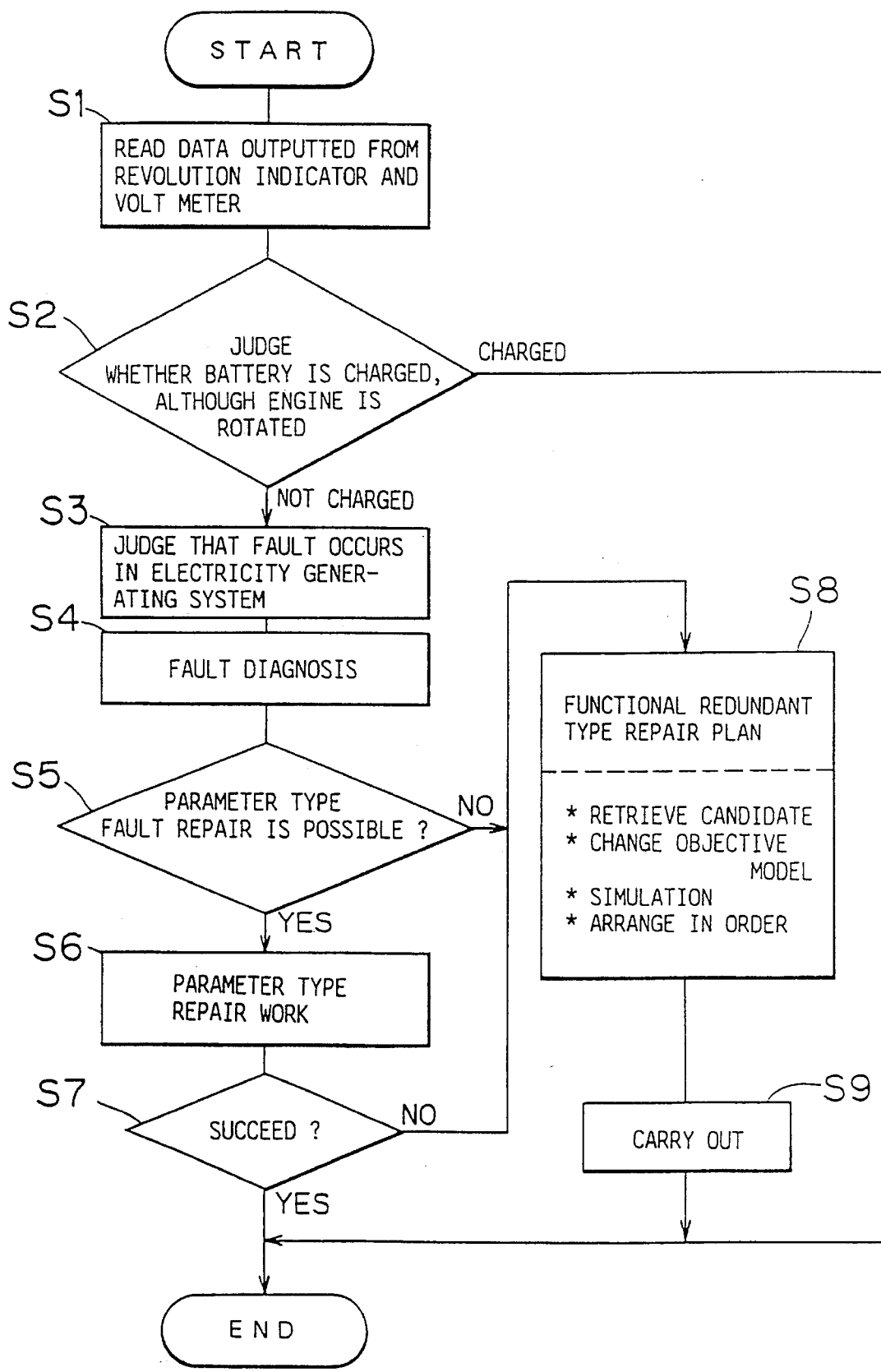
FIG. 12 is a flow chart showing fault repair control carried out by a computer 23 shown in FIG. 11.

FIG. 12 is a flow chart showing fault repair control carried out by the computer 23 shown in FIG. 11. Description is now made of the fault repair control including the development of the functional redundancy system in accordance with the flow of the control shown in FIG. 12.

During a control operation, an output of the revolution indicator 22 and an output of the volt meter 24 are applied to the computer 23. In the computer 23, the number of revolutions of the engine is calculated on the basis of the output of the revolution indicator 22, and a voltage of the battery 13 is judged by the output of the volt meter 24 (step S1).

It is then judged whether or not the battery 13 is charged, although the engine 11 is normally rotated, on the basis of, for example, a correlation between the number of revolutions of the engine and the battery voltage calculated, or the amount of change from the number of revolutions and the battery voltage calculated in the past to the number of revolutions and the battery voltage calculated this time (step S2). At the normal time, the rotation of the engine 11 causes the electricity generator 19 to be rotated through the belt 18, whereby the battery 13 is charged. If there occurs a fault such as cutting of the belt 18, short or inferior conduction of the electricity generator 19, or leakage or cutting of the conductor 20 for connecting the electricity generator 19 and the battery 13, however, the battery 13 is not charged, although the engine 11 is rotated. In such a case, that is, when it is judged in the step S2 that the answer is in the affirmative, it is judged by the computer 23 that a fault occurs in an electricity generating system (step S3).

Figure 13:
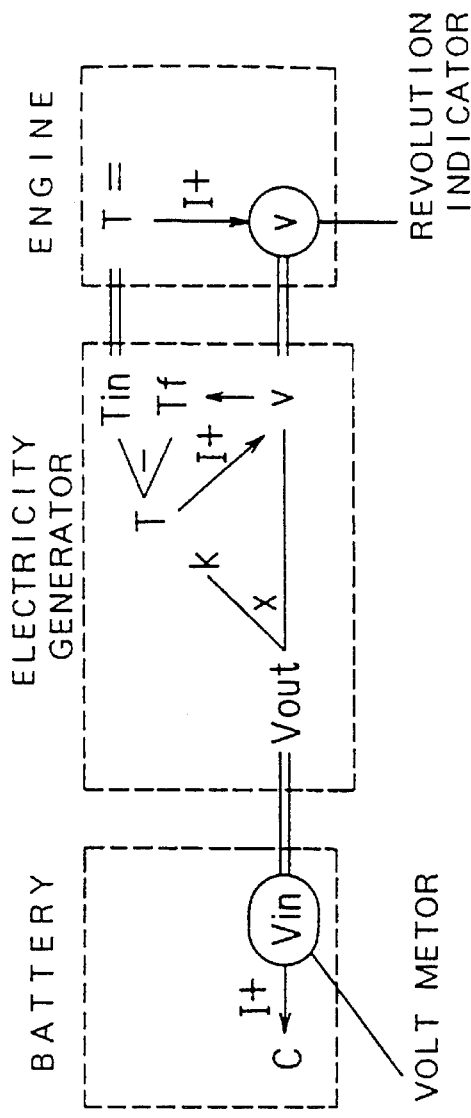
FIG. 13 is a diagram showing a parameter model at the normal time in the construction shown in FIG. 11.

In order to detect a fault cause or a fault, fault diagnosis is made (step S4). Fault diagnosis can be made using a method disclosed in the specification of Japanese Patent Application No. 252191/1990 which is the prior application of the inventors of the present application. Briefly stated, fault diagnosis is made by a correlation between a rotation parameter applied from the revolution indicator 22 and a voltage parameter applied from the volt meter 24. Alternatively, it is preferable that a sensor for detecting a voltage generated by the electricity generator 19 or a rotating state of the electricity generator 19 is provided so as to make fault diagnosis and an output of the sensor is applied to the computer 23 because more accurate fault diagnosis can be made. In the present invention, the method of making fault diagnosis is not a subject and hence, the detailed description is omitted, and a parameter model representing the physical properties of an objective system at the normal time is only shown in FIG. 13.

It is then judged whether or not parameter type fault repair is possible on the basis of the results of the fault diagnosis (step S5). If the parameter type fault repair is possible, parameter type repair work is performed (step S6). The parameter type repair work is performing repair work by manipulating a controlled value of an actuator on the basis of the fault cause or the fault symptom detected in the step S4. For example, the following work is performed: work of changing a resistance value of a resistor inserted in series in a field winding of the electricity generator 19, work of adjusting a variable resistor provided in an input end of the battery 13 to change the resistance in the input terminal of the battery 13, work of changing a voltage value for preventing the battery 13 from being overcharged, or the like.

As a result, it is judged whether or not the parameter type repair work succeeded depending on whether or not a parameter value is returned to a value in the normal range (step S7). When the parameter type repair work succeeded, fault repair processing performed this time is terminated.

On the other hand, when the parameter type repair processing did not succeed (NO in the step S7) or when it is judged that the parameter type fault repair is impossible in the step S5, a functional redundant type repair plan according to the present invention is carried out (step S8). For example, when there occurs a fault such as cutting of the belt 18, short of the electricity generator 19, or cutting of the conductor 20, repair is impossible by the parameter type repair work. In such a case, therefore, the functional redundant type repair plan is carried out.

Figure 14:
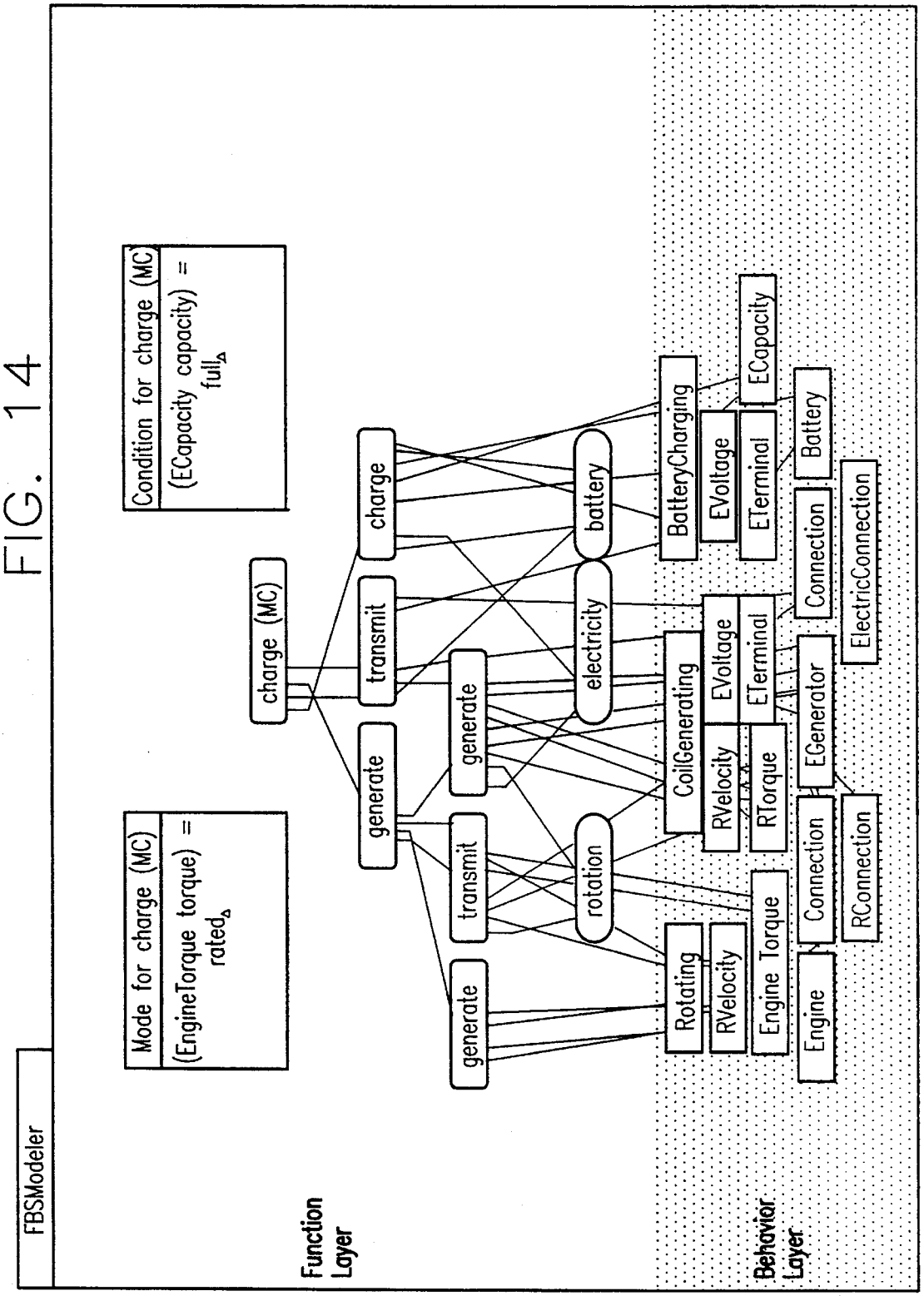
FIG. 14 is a diagram showing an example of display of an FBS diagram with respect to a function "generate electricity" stored in a memory of the computer in the construction shown in FIG. 11.
Figure 15:
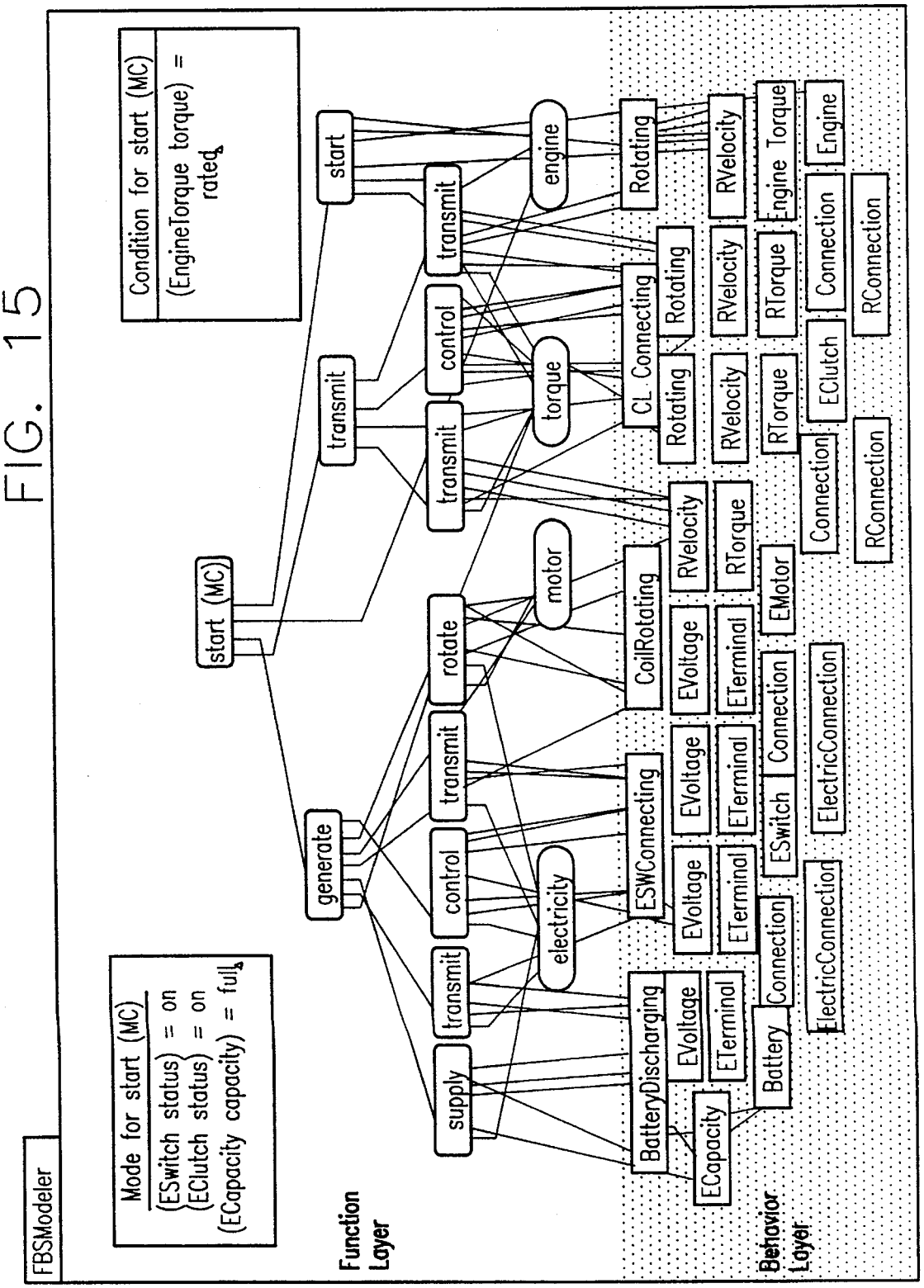
FIG. 15 is a diagram showing an example of display of an FBS diagram representing an engine starting system stored in the memory of the computer in the construction shown in FIG. 11.

As a premise for carrying out the functional redundant type repair plan, an FBS (Function-Behavior-State) diagram previously described is stored in a memory (not shown) of the computer 23. FIGS. 14 and 15 show examples of display of the FBS diagram stored in the memory. FIG. 14 is an FBS diagram with respect to a function "generate electricity" in the construction shown in FIG. 11, and FIG. 15 is an FBS diagram representing an engine starting system. In FIGS. 14 and 15, a round node is a function node representing a function, and a rectangular node is a view node representing a behavior or a part at a behavior and state level. In addition, a sub window at the upper left is the contents of a premise tag, and a sub window at the upper right is the contents of a holding condition tag.

Figure 16:
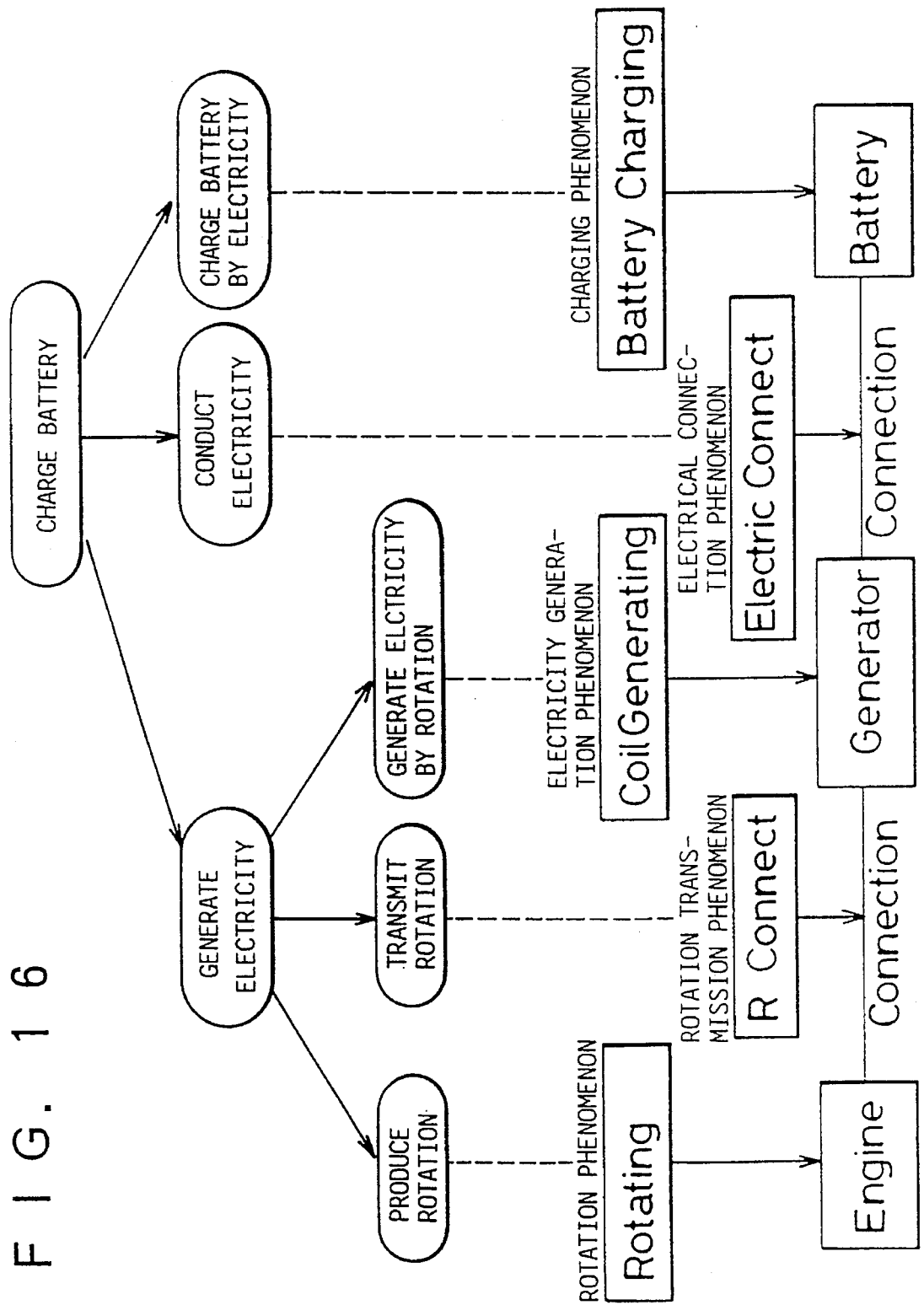
FIG. 16 is a diagram obtained by modeling the FBS diagram with respect to the function "generate electricity" by simplifying an electricity generating system.
Figure 17:
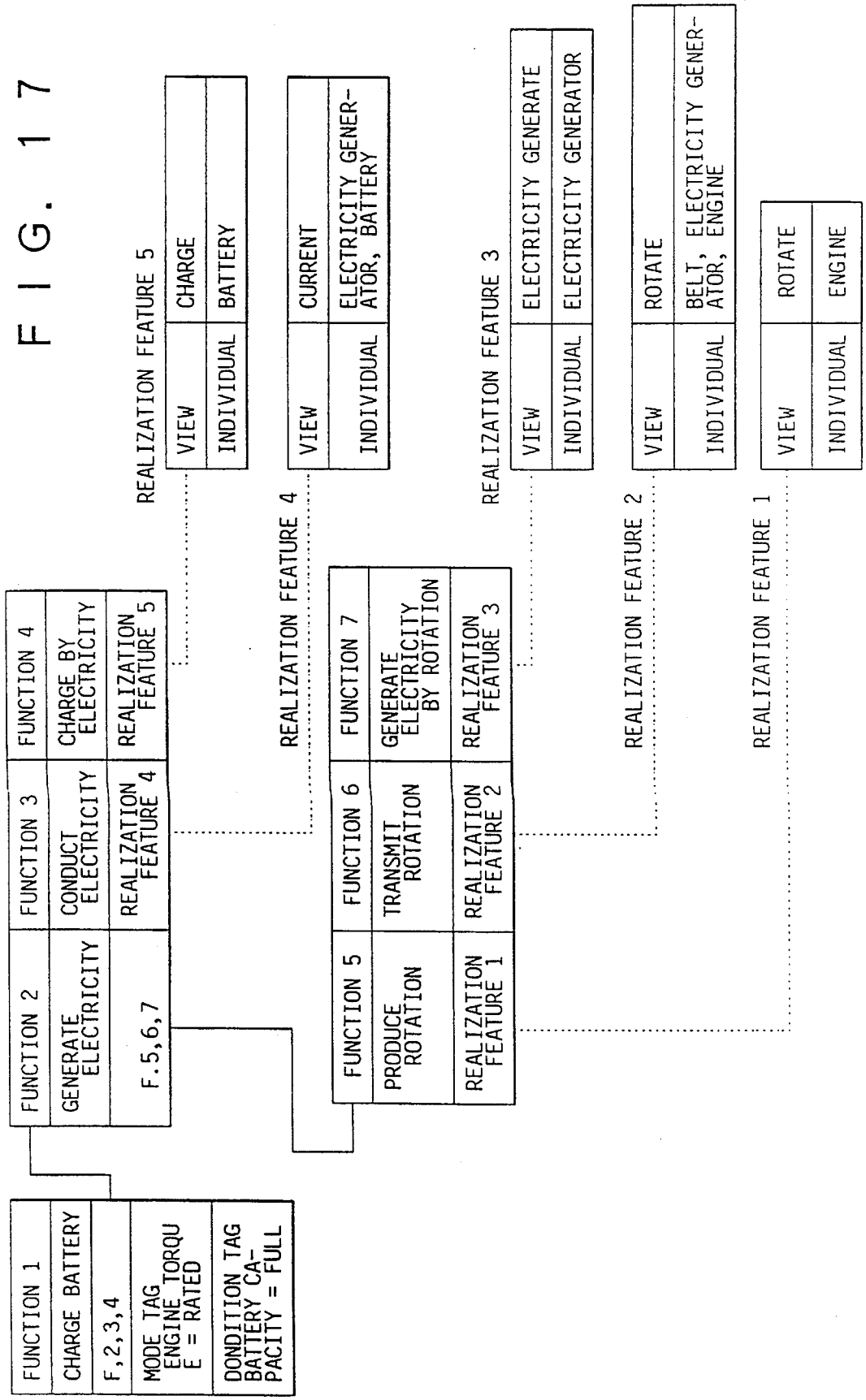
FIG. 17 is a diagram showing a function knowledge and development knowledges related to the function "generate electricity"

The FBS diagram with respect to the function "generate electricity" can be modeled as shown in FIG. 16 by simplifying an electricity generating system. A function knowledge and development knowledges of an electricity generating portion modeled shown in FIG. 16 are the contents shown in FIG. 17. In FIG. 17, a function name "charge a battery" is described in a label "Function 1", and "Function 2", "Function 3" and "Function 4" are described as development knowledges. In addition, "engine torque is generated" is described in the premise tag, and "a battery capacity is satisfied" is described in the holding condition tag. The function knowledge is so developed as to construct a hierarchical structure on the basis of the development knowledges. Such a developing method follows a method of realizing the FBS diagram previously described.

In the computer 23, an alternate portion potentially comprising a function which can be substituted for the function "generate electricity" is retrieved on the basis of the above described FBS diagram as shown in FIGS. 14 to 17 stored in the memory. As a result, in the present embodiment, it is determined that the function "generate electricity" can be realized by forcing the starting motor 15 to be rotated. In addition, when the function "generate electricity" is realized by the starting motor 15, what construction is to be used, that is, a functional redundancy system of the function "generate electricity" is derived using the FBS diagram. The FBS diagram representing the redundancy system of the function "generate electricity" derived is shown in FIG. 18.

Figure 18:
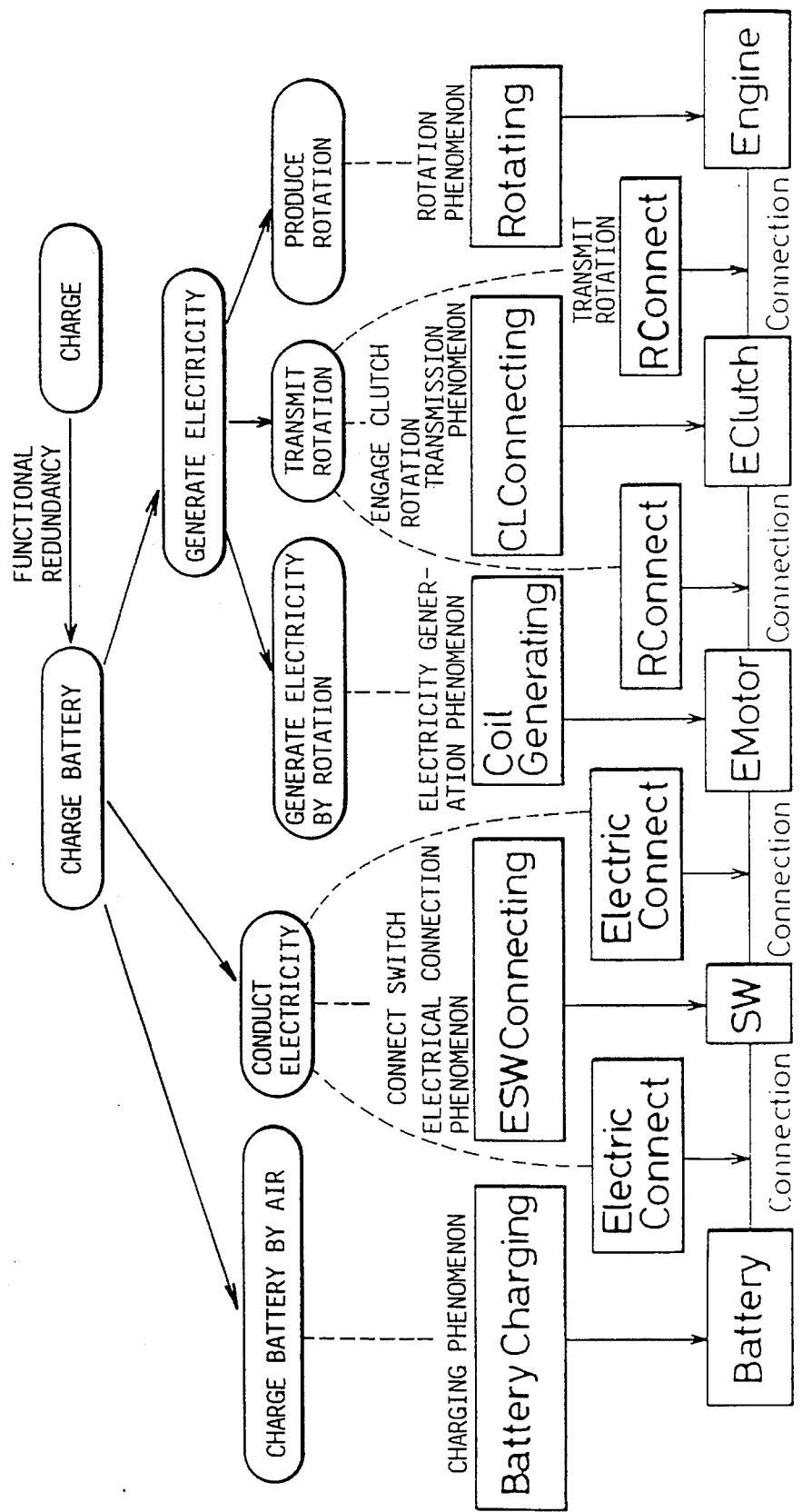
FIG. 18 is a diagram showing an FBS diagram representing a redundancy system of the function "generate electricity" derived in the construction shown in FIG. 11.

As shown in FIG. 18, the starting motor 15 which is not used during the rotation of the engine 11 constitutes the functional redundancy system of the function "generate electricity" as a substitute for the electricity generator 19. At the time of occurrence of a fault in the electricity generator 19, the construction is altered by the clutch 16 and the switch 12 so that electricity is generated by the starting motor 15.

As is already apparent, this utilizes the fact that the function "generate electricity" is performed by a physical realization structure for translating rotation into electricity by the engine as well as a potential function "translate rotation into electricity" of the starting motor 15.

More specifically, the functional redundant type repair plan is carried out by the following algorithm:

(1) Derivation of candidate for functional redundancy system

In the construction shown in FIG. 16, a function lost, that is, a functional portion having a functional redundancy system in the function "generate electricity" is retrieved. When no functional portion having a functional redundancy system can be found, the functional redundant type repair plan fails in this stage.

A functional portion including no fault derived in the fault diagnosis in the step S4 (see FIG. 12) out of functional portions having a functional redundancy system is derived as a candidate for functional redundancy. In this example, the functional redundancy system of the function "generate electricity" utilizing a portion of an engine starting system is selected.

(2) Alteration of objective model

The structure of the objective apparatus is altered on the basis of the functional redundancy system selected in the previous item (1). The objective model is changed to a model in a state where a functional redundancy system shown in FIG. 18 is developed.

(3) Repair simulation

Repair simulation is actually done on the basis of the objective model in which the functional redundancy system is developed before the functional redundancy system is actually operated. This simulation is the same simulation done in the parameter type fault repair.

Figure 19:
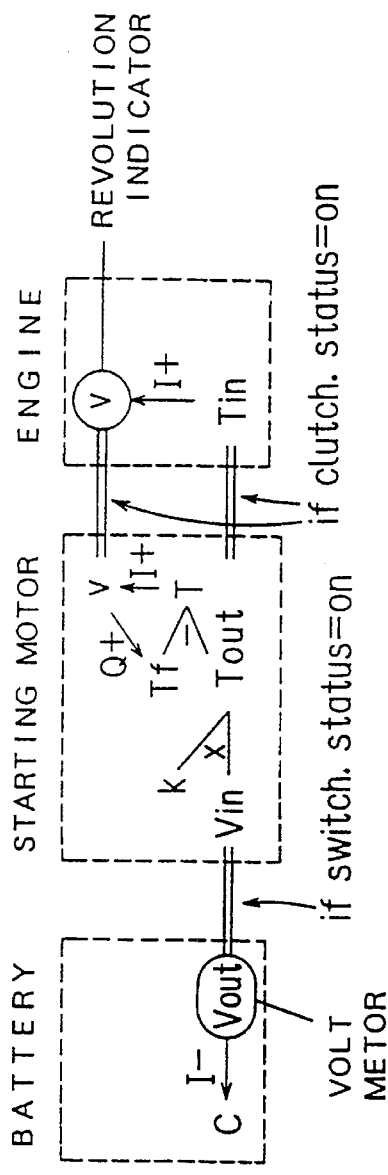
FIG. 19 is a diagram showing a parameter model in a case where the function "generate electricity" is replaced with a functional redundancy system using a starting motor in the construction shown in FIG. 11.

FIG. 19 shows a parameter model at the time of utilizing a functional redundancy system.

(4) Arranging the candidates in order

It is judged on the basis of the objective model after repair obtained as a result of the repair simulation whether or not the functional redundancy system is operated, the function is recovered, and secondary adverse effects are exerted on the other portions, for example, with respect to a fault currently occurring. As a result of the repair simulation, a candidate whose functional redundancy system is not operated and a candidate whose function is not recovered are deleted at this time point. Candidates which are not deleted are arranged in the order of their increasing secondary effects.

In the above described manner, the functional redundant type repair plan is carried out.

Repair in the step S9 shown in FIG. 12 is then made. In the present embodiment, the starting motor 15 develops the function "generate electricity". As a result, the battery 13 is charged.

Meanwhile, a regulator is generally added to the electricity generator 19 so as to prevent the battery 13 from being overcharged. Since no regulator is added in this functional redundancy system, however, the battery 13 is liable to be overcharged. In this case, the overcharging can be prevented by parameter type self-repair. That is, when an output voltage of the volt meter 24 is not less than a normal value, it is judged that an abnormality occurs and the cause thereof is an excessively large amount of electricity generation. From the result, the clutch 16 is disengaged or the switch 12 is opened, to stop electricity generation or charging.

Furthermore, when a voltage of the volt meter 24 is read to determine that a voltage of the battery 13 is reduced, charging by the starting motor 15 may be resumed by engaging the clutch 16 again or turning the switch 12 on. Such a control loop is dynamically formed on the computer 23 using the FBS diagram.

Description was made by taking as an example the functional redundancy system in the relationship between the electricity generator and the starting motor in the automobile. In the case of the functional redundancy system in such a relatively simple apparatus system, only the conclusion of the functional redundant type repair plan is previously stored in the memory instead of carrying out the functional redundant type repair plan every time a fault occurs in the apparatus system, thereby to make it possible to carry out the functional redundant type repair plan more quickly.

Specifically, the memory previously stores the conclusion that when a function "generate electricity" is lost, the functional redundancy system of the function "generate electricity" is developed utilizing the starting motor 15", and also stores the contents to be altered of the objective model required in the case. This makes it possible to carry out the functional redundant type repair plan in a significantly short time.

Such a simplified type functional redundancy system can be effectively made use of when cases of fault causes and fault symptoms are accumulated even in a relatively simple apparatus or a slightly complicated apparatus system.

On the other hand, a method of carrying out the functional redundant type repair plan utilizing the FBS diagram every time a fault occurs is effective in cases where an apparatus system becomes huge, for example, in a very large-scale apparatus system such as an integrated plant constructed in a wide area or a satellite station floating in a space. The most suitable functional redundant type repair plan can be derived every time a fault occurs.

2-3. Concrete example using electrophotographic copying machine as objective apparatus FIG. 20 is a block diagram showing the control structure of an image forming mechanism in an electrophotographic copying machine.

Figure 20:
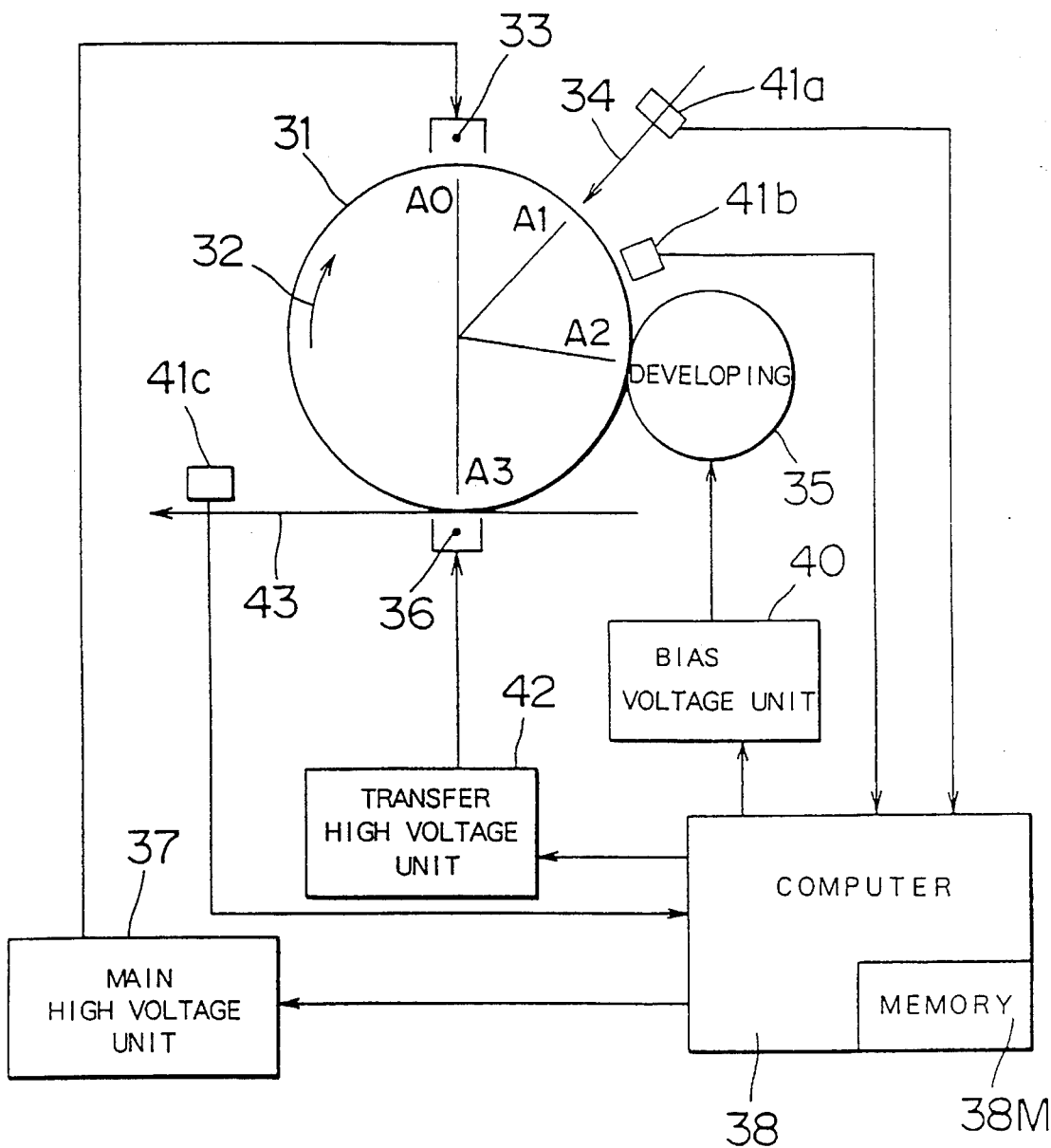
FIG. 20 is a diagram showing the control structure of an image forming mechanism in an electrophotographic copying machine.

In the control structure shown in FIG. 20, a photosensitive drum 31 is rotated at predetermined speed in the direction indicated by an arrow 32, principally charged at a drum angle A0, exposed at a drum angle A1, developed at a drum angle A2, and transferred at a drum angle A3. Therefore, a main charger 33 is arranged opposed to the drum angle A0 around the photosensitive drum 31, and original reflected light 34 is irradiated at the drum angle A1 to form an image. In addition, a developing device 35 is provided opposed to the drum angle A2, and a transferring corona discharger 36 is arranged opposed to the drum angle A3.

A high voltage is applied to the main charger 33 from a main high voltage unit 37 controlled by a computer 38. For example, a high voltage of, for example, +5.7 kV is applied to the main charger 33, so that the main charger 33 uniformly charges the surface of the photosensitive drum 31 by corona discharges.

If the photosensitive drum 31 whose surface is uniformly charged by the main charger 33 at the drum angle A0 is rotated to make the drum angle A1, the surface of the photosensitive drum 31 is exposed to the original reflected light 34. The amount of the original reflected light 34 is measured by an AE sensor 41a, to be applied to the computer 38. In addition, a surface potential of the photosensitive drum 31 which is exposed to the original reflected light 34 and from which charges charged on the exposed portion are removed is measured by a surface potential sensor 31b, to be applied to the computer 38.

Furthermore, when the photosensitive drum 31 is rotated to make the drum angle A2, development is performed by the developing device 35. At this time, a developing bias voltage of, for example, +250 V is applied to a bias voltage unit 40 to the developing device 35. The bias voltage unit 40 is placed under control of the computer 38.

Additionally, when the photosensitive drum 31 is rotated to make the drum angle A3, the computer 38 applies a driving signal to a transfer high voltage unit 42. A high voltage of, for example, +6.5 kV is applied to the transferring corona discharger 36 from the transfer high voltage unit 42, so that the transferring corona discharger transfers toner on the surface of the photosensitive drum 31 to a paper sheet 43 conveyed by corona discharges. The density of a toner image transferred to the paper sheet 43 is detected by a density sensor 41c, to be applied to the computer 38.

The computer 38 monitors a state where an image is formed on the basis of detected values given from the three sensors, that is, the AE sensor 41a, the surface potential sensor 41 and the density sensor 41c.

Figure 21:
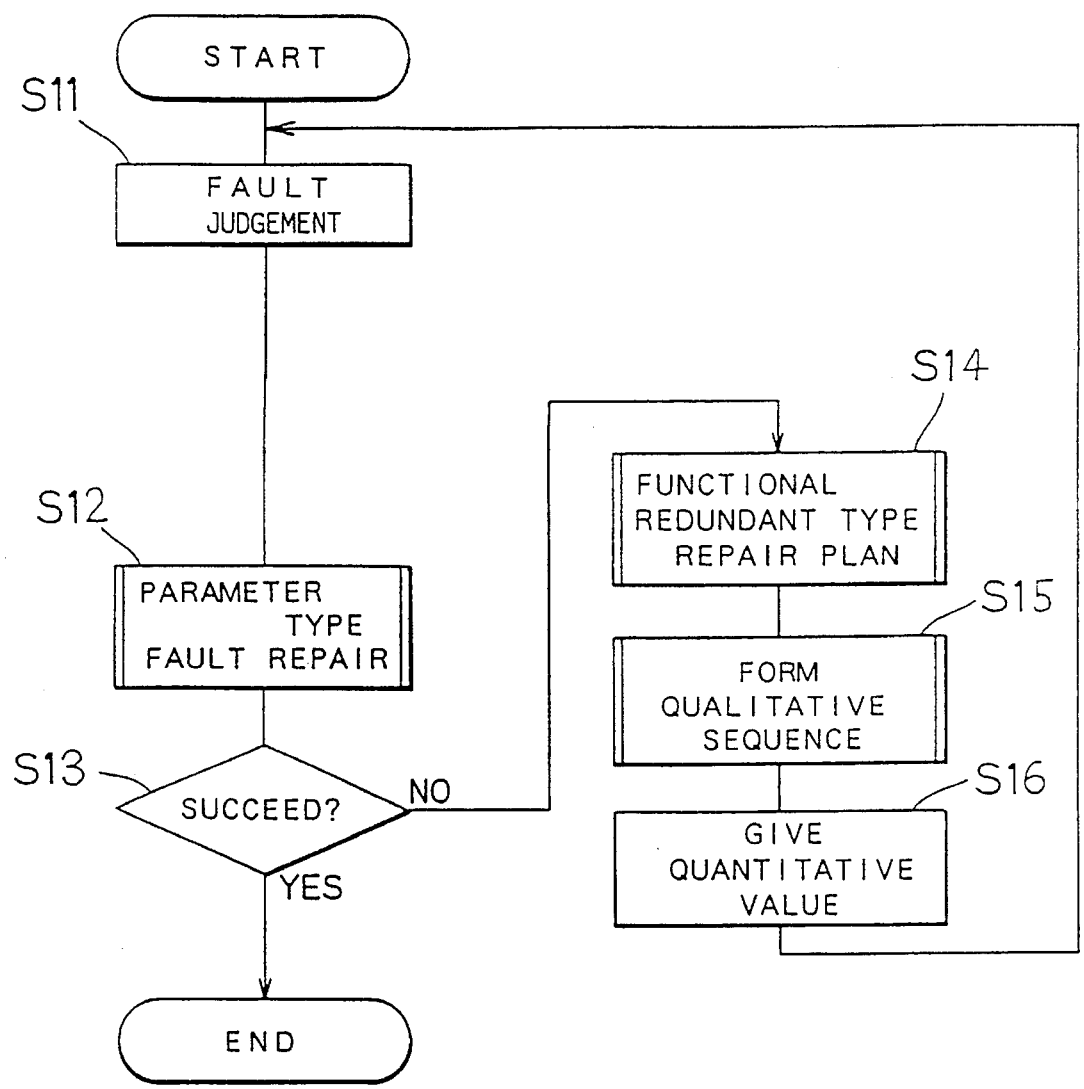
FIG. 21 is a flow chart showing the outline of fault diagnosis and repair control in a computer shown in FIG. 20.

FIG. 21 is a flow chart showing the outline of fault diagnosis and repair control in the computer 38. Description is now made in accordance with the flow of the flow chart shown in FIG. 21.

If it is judged by the computer 38 that "picture image density low" is taken up as a fault symptom, inference on the cause of the fault symptom, that is, fault judgment is made (step S11).

The fault judgment is made on the basis of detection data of the three sensors 41a, 41b and 41c. The fault judgment is realized by comparing the holding condition of a function (functional evaluation knowledge) which is positioned in the highest order on a functional hierarchical network of the objective model with a sensor value. For example, in the present embodiment, the sensor value is applied to a holding condition tag "drum potential≧normal" of the most significant function "charge a drum", thereby to judge, for example, that a charging function does not hold, that is, a fault occurs.

It is then judged whether or not parameter type fault repair is possible on the basis of the results of the fault judgment (step S12). When the parameter type fault repair is possible, parameter type repair work is performed (step S13). As a result, it is judged whether or not the parameter type repair work succeeded depending on whether or not a parameter value is returned to a value in the normal range (step S14). If the parameter type repair work succeeded, fault repair processing performed this time is terminated.

On the other hand, when the parameter type repair processing did not succeed (NO in the step S14) or it is judged in the step S12 that the parameter type fault repair is impossible, a functional redundant type repair plan according to the present invention is carried out (step S15). If the above described fault is, for example, "a main charger breaks down", parameter type fault repair is impossible, whereby the functional redundant type repair plan in the step S15 is carried out.

Figure 22:
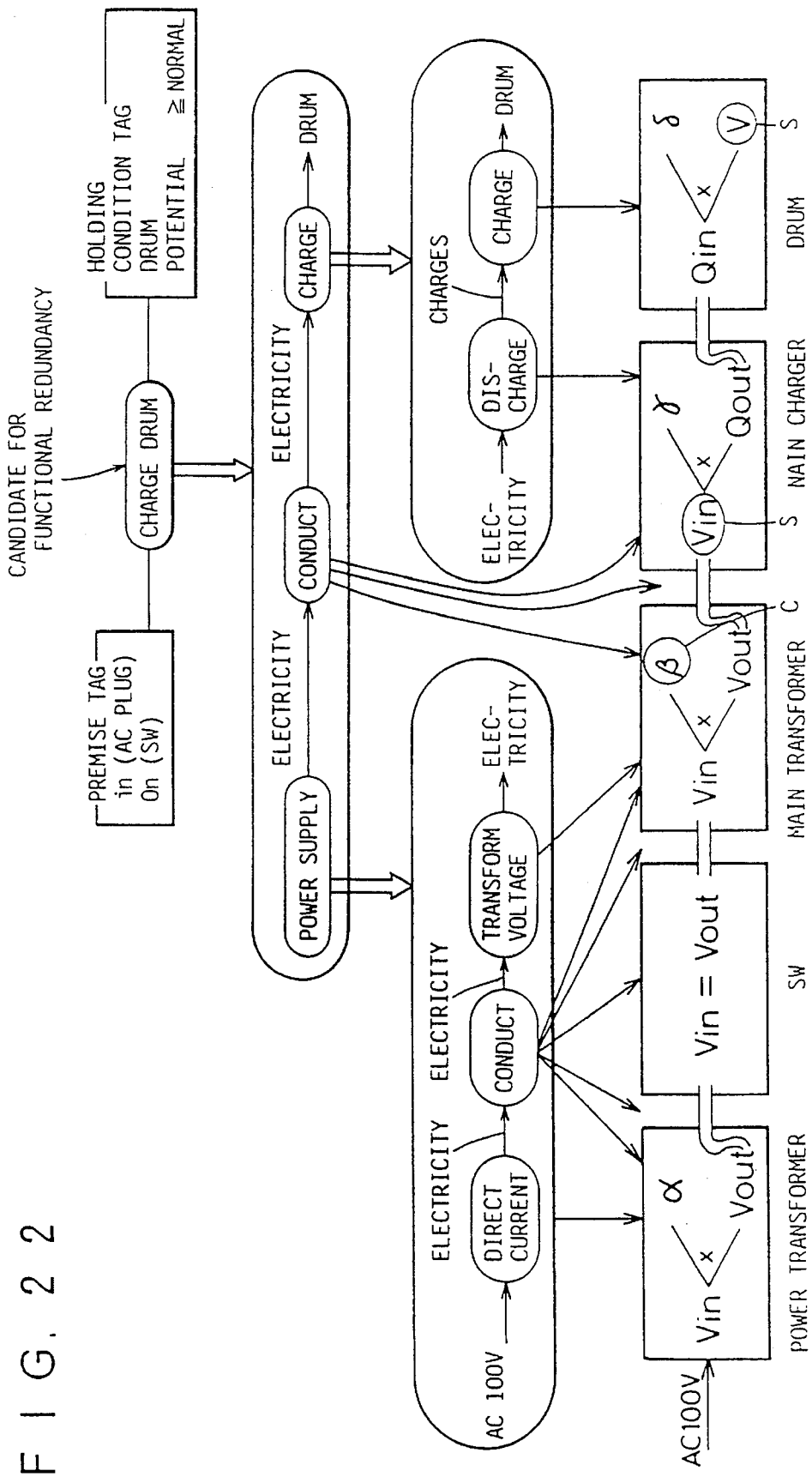
FIG. 22 is a diagram showing an FBS diagram of a charging functional portion simplified for convenience of illustration.

As a premise for carrying out the functional redundant type repair plan, an FBS diagram using as an objective model a charging functional portion is stored in the memory 38M in the computer 38. FIG. 22 shows the FBS diagram of the charging functional portion simplified for convenience of illustration. In addition, FIG. 23 shows the contents of a function knowledge and development knowledges with respect to a charging function of the photosensitive drum. In FIG. 23, a function name "charge a drum" is described in a label "Function 1", and a development knowledge 1 is described therein. In addition, "a power plug is inserted and a power switch is turned on" is described as a premise tag, and "drum potential≧normal (reference potential)" is described as a holding condition tag. The function knowledge is so developed as to construct a hierarchical structure on the basis of the development knowledge 1. That is, the development knowledge 1 indicates respective labels "Function 2", "Function 3" and "Function 4", and "Function 2" and "Function 4" are respectively developed into development knowledges 2 and 3. In addition, a function name "conduct electricity" is described in "Function 3", and "a realization feature 4: view=current, individual=main transformer, main charger and wires 4 and 5" is described as its realization feature. Such a developing method follows a method of realizing the FBS diagram previously described.

The computer 38 retrieves a charging function substituted for the main charger 33 so as to charge the photosensitive drum 31 on the basis of the FBS diagram, the function knowledge and the development knowledges shown in FIGS. 22 and 23 which are stored in the memory 38M. That is, a candidate for functional redundancy in a function lost by a fault "charging function" is retrieved. If no candidate for functional redundancy can be found, the repair plan fails in this stage.

On the other hand, if a candidate for functional redundancy can be found, a redundancy system including no fault derived in a fault diagnosing portion is selected as its redundancy system. As a result, in the present embodiment, the transferring corona discharger 36 is selected as a functional redundancy system.

Figure 25:
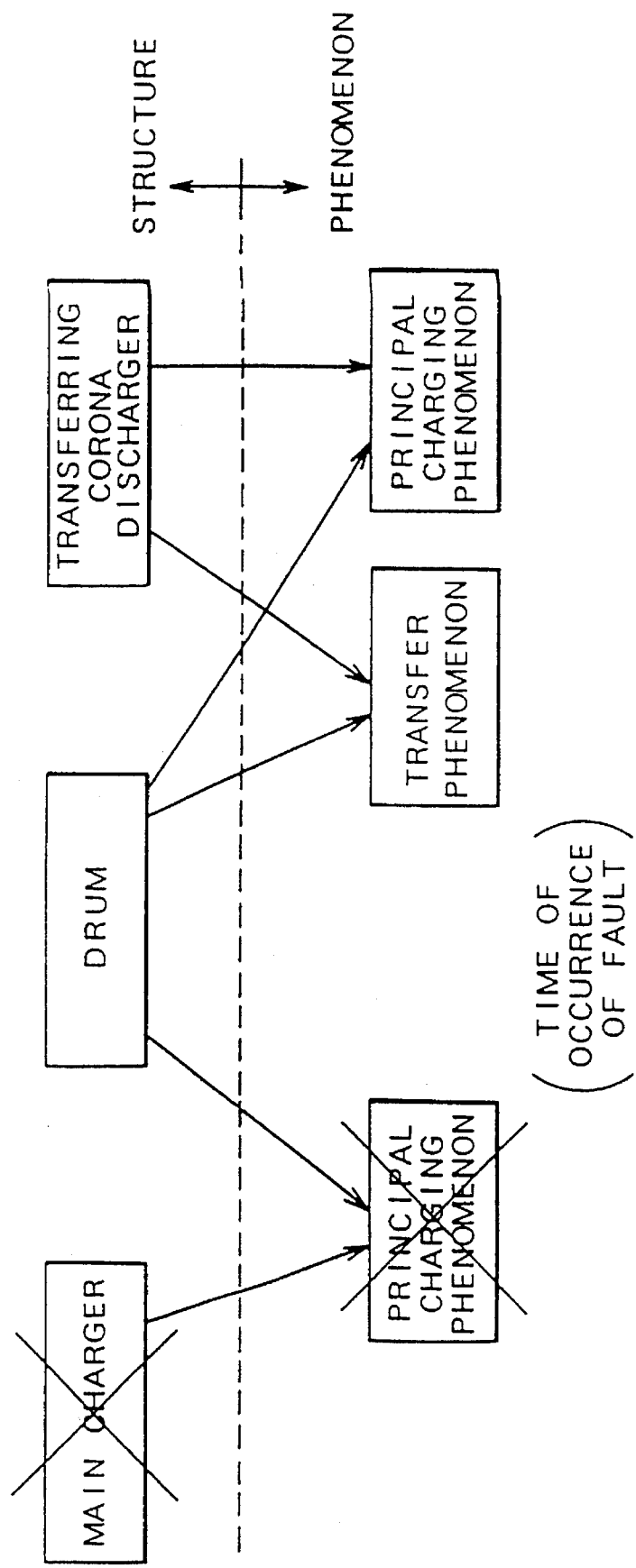
FIG. 25 is a diagram showing structures and phenomena of an objective model in a state where a principal charging phenomenon is developed by a transferring corona discharger when a fault occurs in a main charger.

Briefly stated, the objective model comprises structures and phenomena as shown in FIG. 24 at the normal time. A principal charging phenomenon is developed by the main charger, while a principal charging phenomenon by the transferring corona discharger provides a potential function. When a fault occurs, the principal charging phenomenon by the main charger cannot be developed, so that the principal charging phenomenon by the transferring corona discharger which provides a potential function is developed, as shown in FIG. 25.

Figure 26:
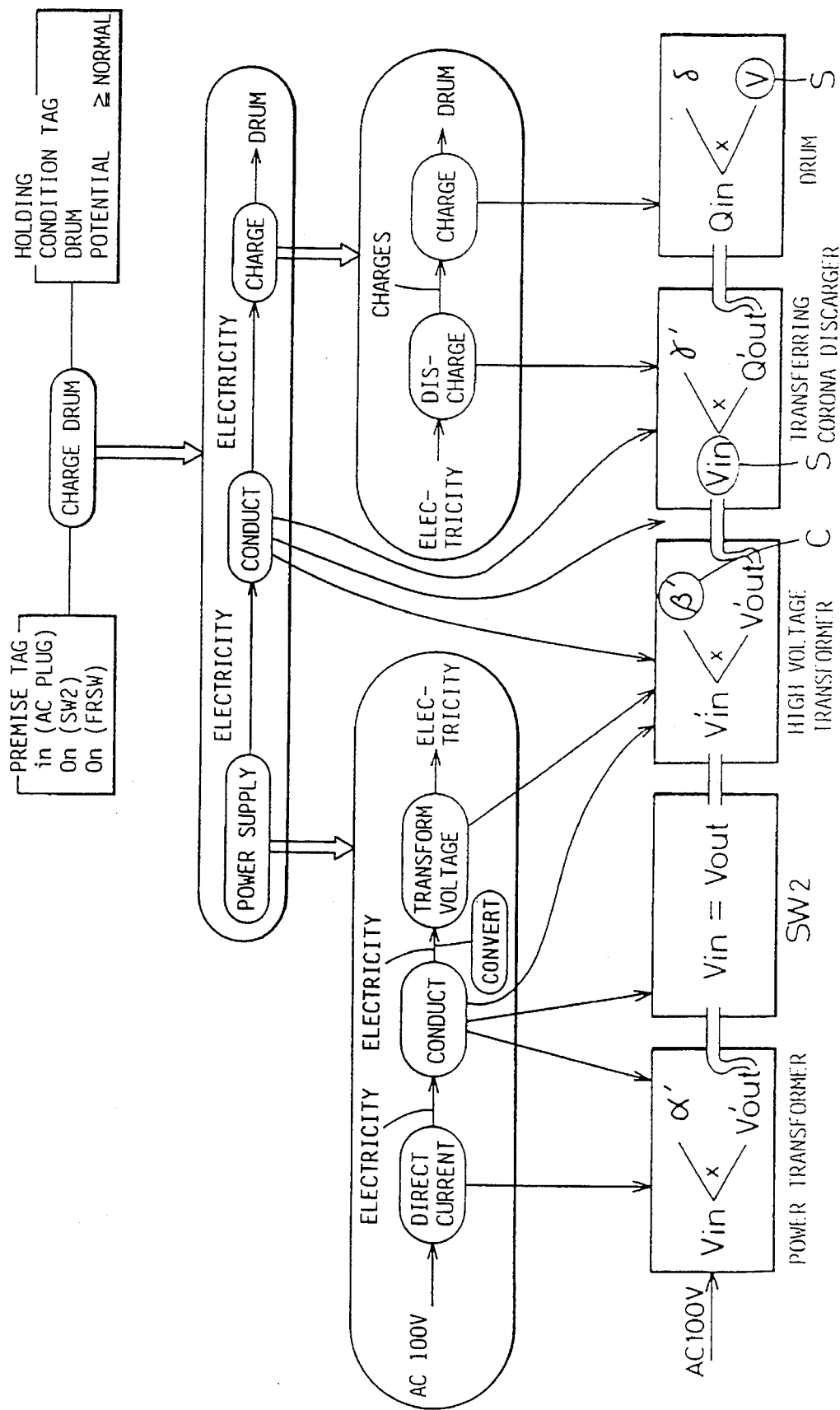
FIG. 26 is a diagram showing an objective model in a case where a transferring corona discharger is used as a functional redundancy system using an FBS diagram.

When the transferring corona discharger 36 is used as a functional redundancy system, the objective model is represented by the FBS diagram as shown in. FIG. 26.

A qualitative sequence for image formation processing required in a case where the transferring corona discharger 36 is used as a functional redundancy system is formed (step S15 in FIG. 21). The qualitative sequence is formed in the following order.

Figure 27:
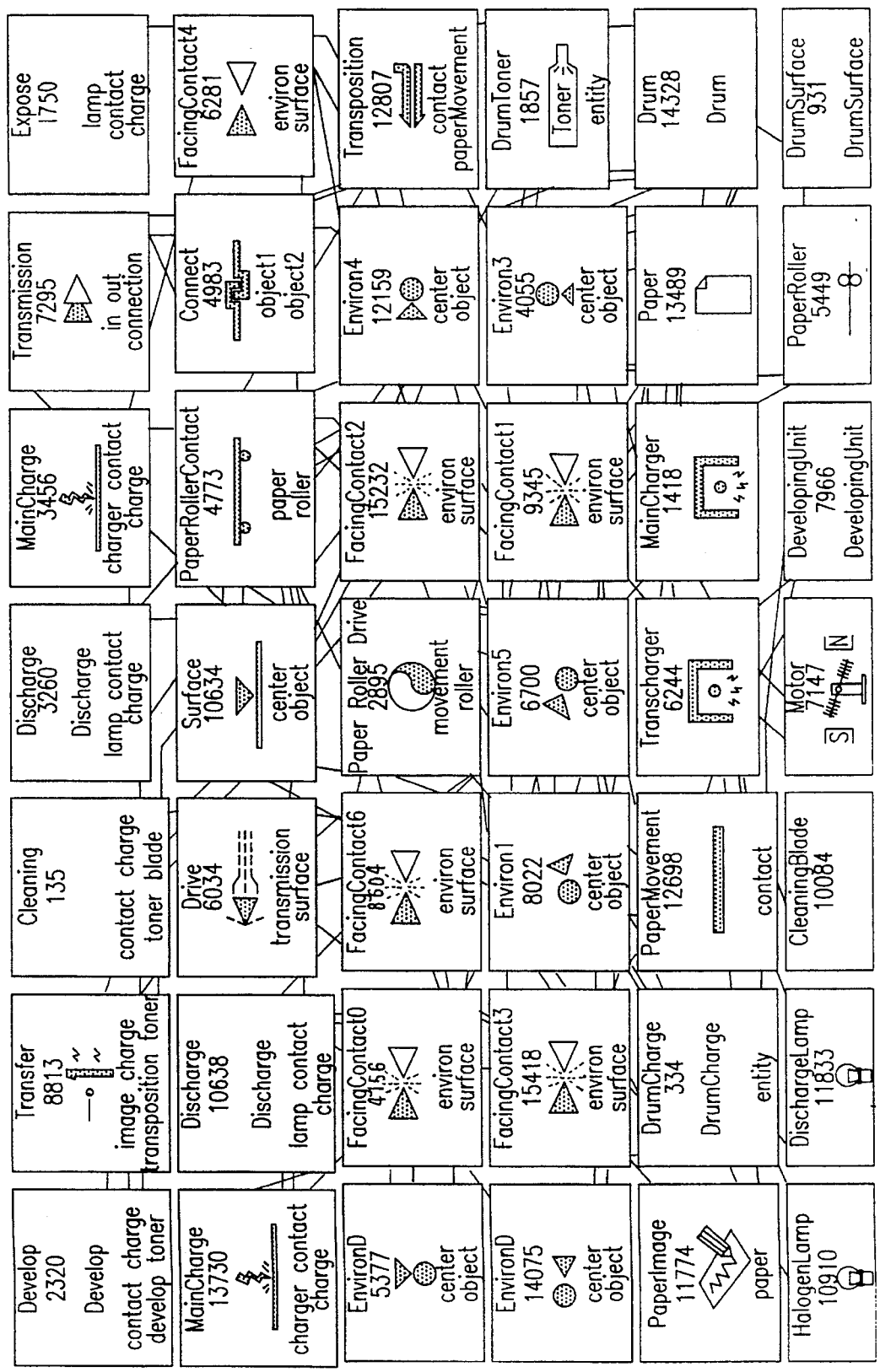
FIG. 27 is a diagram showing an example of display representing the dependent relationship among all phenomena which may occur on a view network with respect to an image forming mechanism of a copying machine.

(1) As a premise, a structure and a required behavior required to form a qualitative sequence are previously inputted and stored as an objective model of the candidate for functional redundancy selected in the above described manner. The structure comprises parts constituting an objective apparatus, the nature of the relationship among the parts, and physical phenomena described using the above described individual, individual view and process view. That is, the structure is described as a view network. All physical phenomena which may occur with respect to the view network inputted are derived by behavior simulation, and the holding conditions thereof are derived, to manage the state description by an ATMS (Assumption based Truth Maintenance System; advocated by De Kleer). FIG. 27 shows an example of display representing the dependent relationship among all the phenomena which may occur on the view network thus derived.

Furthermore, the required behavior is previously inputted and stored. The required behavior is inputted and stored in two stages. Specifically:

(i) Input of Instantaneous state: Phenomenon, parameter values and the like which are desired to occur as a minimum in a certain state.

(ii) Input of time relationship among states: the representation of the time relationship between instantaneous states. For example, in this concrete example, enumeration of phenomena which are desired to occur "Principal charge→transfer", and the change in parameter "Paper image nothing→Paper image full".

(2) A qualitative sequence is then formed on the basis of the foregoing structure and required behavior which are inputted and stored.

Prior to describing the formation of the qualitative sequence, a qualitative timing chart at the normal time in the image forming mechanism shown in FIG. 20 will be described with reference to FIG. 28. Phenomena at the time of image formation are developed in the order of initial, principal charge, exposure, development and transfer phenomena. The initial phenomenon appears at the time 0. In this case, the charging quantity of a drum is "nothing" and the toner density on the drum is "nothing". At the time 1, the principal charge phenomenon is developed. In this case, a principal charge mode is ON (MC mode=ON), the drum angle is A0, and the charging quantity of the drum is changed from "nothing" to "Full". At the time 2, the exposure phenomenon is then developed. In this case, a halogen lamp is turned on (H1 mode= ON), the drum angle is A1, and the charging quantity of the drum is changed from "Full" to "Exposed". At the time 3, the development phenomenon is developed. In this case, a development mode is ON (Dev mode=ON), the drum angle is A2, the toner density of the drum is changed from "nothing" to "Full". In addition, at the time 4, the transfer phenomenon is developed. In this case, a transfer charge mode is ON (TC mode= ON), the drum angle is A3, the toner density of the drum is "Full".

In such a qualitative timing chart for normal image formation, the required behavior is "principal charge→transfer". That is, the transfer phenomenon must be developed after the principal charge phenomenon is developed.

Description is now made of a qualitative timing chart for image formation at the time of occurrence of a fault, that is, the formation of the qualitative sequence.

Figure 29:
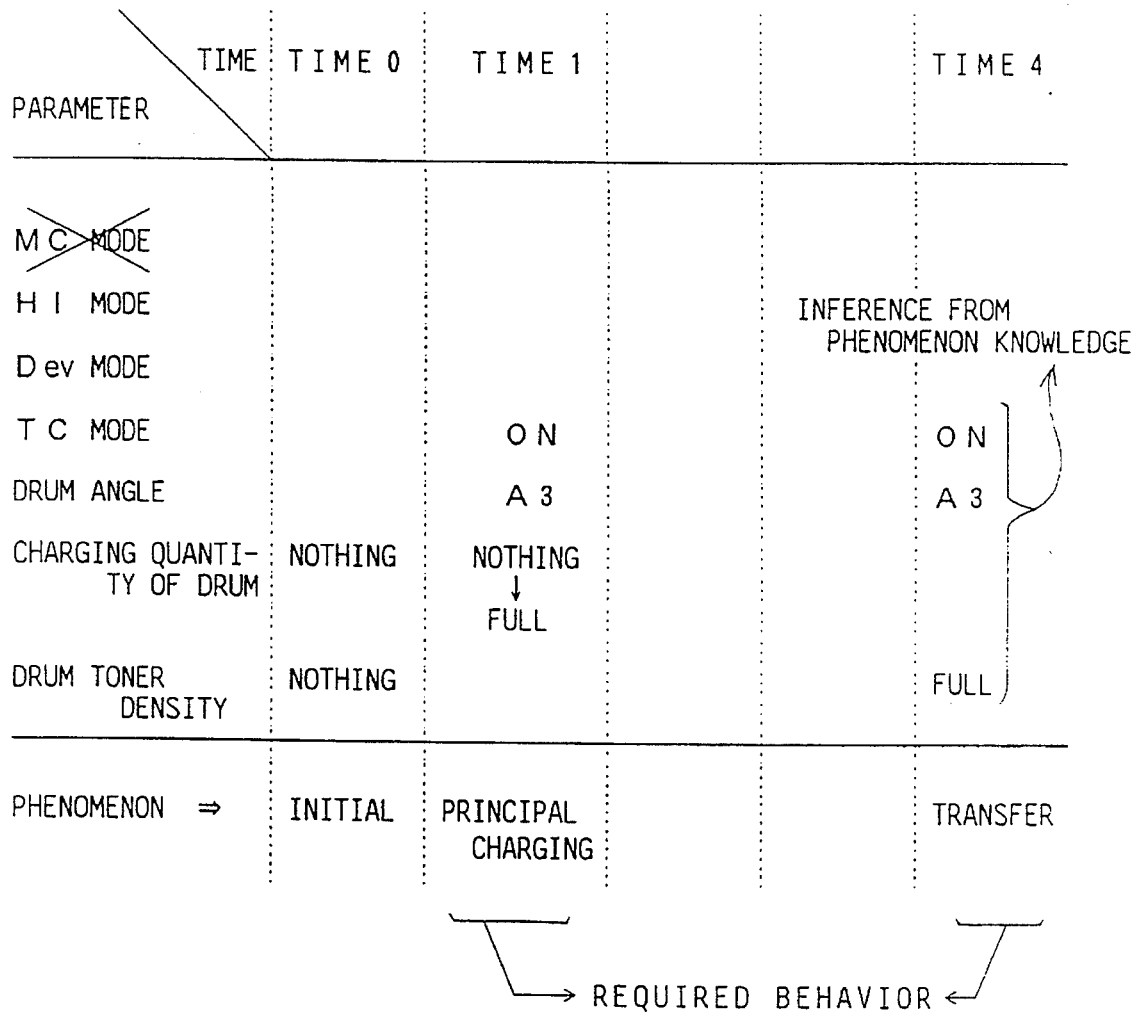
FIG. 29 is a diagram for explaining a method of forming a qualitative sequence at the time of occurrence of a fault.

First, "principal charge→transfer" is derived as the required behavior, and parameter values and the like for each instant in the required behavior is derived from a dependent relationship network of phenomena shown in FIG. 24, as shown in FIG. 29. For example, in order to charge the drum by the transferring corona discharger 36, the following knowledges are derived by retrieving the premise conditions of all the phenomena which may occur shown in FIG. 24:
Conditions:
 transfer charge mode=ON
 drum angle=A3
Effect:
 drum change=nothing→Full.
Similarly, in order to transfer an image by the transferring corona discharger 36, the following knowledges are required:
Conditions:
 transfer charge mode=ON
 drum angle=A3
 drum toner=Full.
Accordingly, a timing chart as shown in FIG. 29 is produced.

Figure 30:
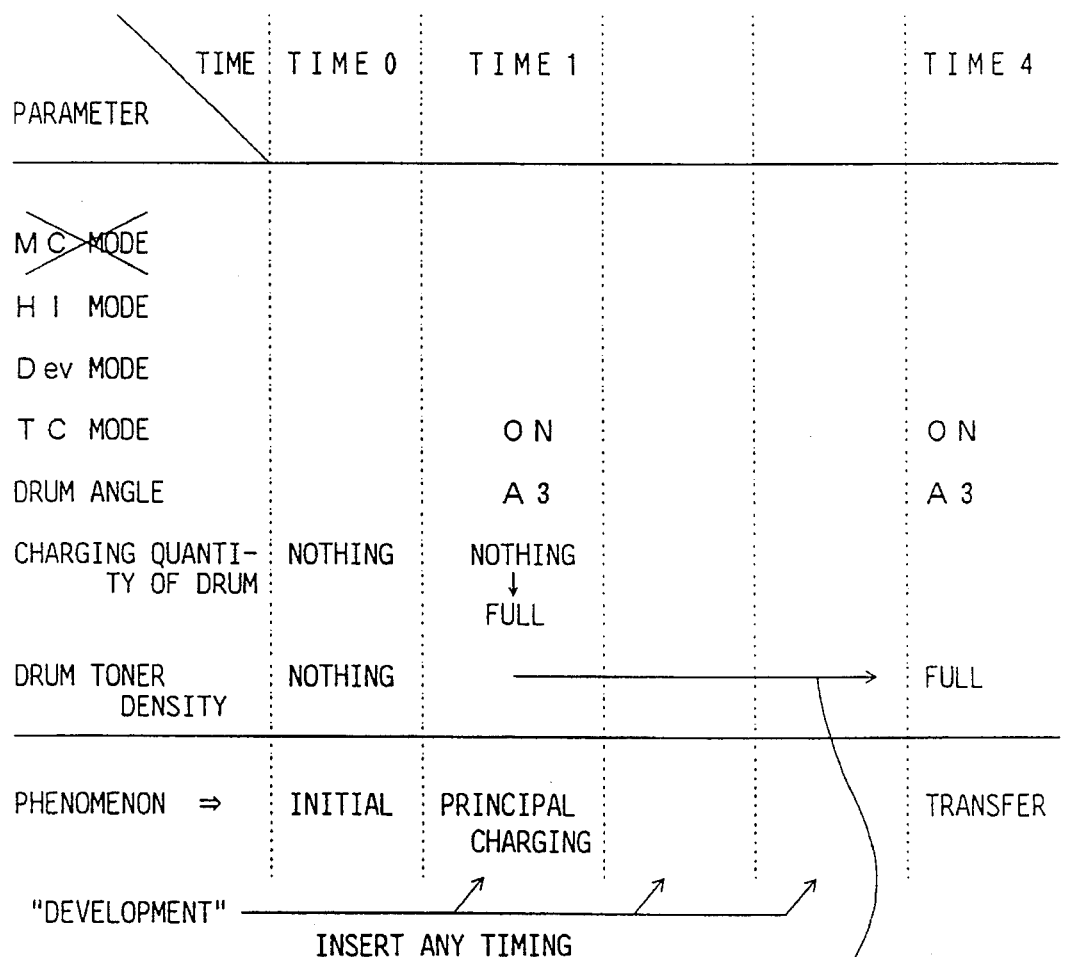
FIG. 30 is a diagram for explaining a method of forming a qualitative sequence at the time of a fault.

A phenomenon which must occur between instantaneous states is then derived. As shown in FIG. 30, the drum toner is "nothing" at the time 0, and the drum toner is "Full" at the time 4. Therefore, it can be presumed that "development" must occur as a phenomenon between the time 0 and the time 4.

Therefore, a timing chart shown in FIG. 31 is produced on the basis of the following premise conditions and effect required for the development phenomenon:
Conditions:
 development mode=ON
 drum angle=A2
 drum charge=Exposed
Effect:
 drum toner=nothing→Full.

In such a manner, the presumption is repeated until the required behavior is satisfied, to fill the discontinuity of all the parameters. As a result, a qualitative timing chart at the time of the occurrence of a fault in the main charger 33 as shown in FIG. 32 is completed.

The timing chart shown in FIG. 32 is a qualitative timing chart. Accordingly, a quantitative value is given to the timing chart to determine the charging time or the like by the transferring corona discharger 36, whereby the control sequence is completed (step S16 in FIG. 21). In this case, the rotation speed of the photosensitive drum 31 is predetermined, and the drum angles A0, A1, A2 and A3 are predetermined, so that the time lengths of the time 0 to the time 4 are naturally determined.

As described in the foregoing, the redundancy system is selected by the functional redundant type repair plan, and the qualitative sequence is further formed and a quantitative value is added thereto, whereby a control program to be executed by the computer 38 is completed.

Before control is actually carried out in accordance with a control program completed, parameter type repair simulation is done, it is judged whether or not the functional redundancy system is operated, the function is recovered, and no secondary adverse effects are exerted, for example, and then, the apparatus is operated.

Even when the above described image forming mechanism in the electrophotographic copying machine is used as an objective apparatus, the image forming mechanism can be of construction comprising a so-called simplified type functional redundancy system, as in the case where the automobile is used as an objective apparatus as previously described. That is, the conclusion that when a function "charge" by a main charger is lost, develop a functional redundancy system having the function "charge" by a transferring corona discharger is previously stored in a memory, and a qualitative sequence required in the case is previously prepared and stored in the memory. Consequently, the inference of the functional redundant type repair plan and the qualitative sequence can be realized by reading out the functional redundant type repair plan and the qualitative sequence from the memory, thereby to make it possible to carry out functional redundant type fault repair in a significantly short time.

More specifically, when with respect to a plurality of function developing means, the presence or absence and the contents of a function which is different from a function inherently required and is not ordinarily developed but is potentially developed by each of the function developing means are retrieved, a method of performing sequential retrieval utilizing the FBS diagram every time a fault or the like occurs may be used. Alternatively, a method of previously performing such retrieval and storing the results of the retrieval in the memory to read out corresponding data from the memory at the time of occurrence of a fault or the like can be adopted when the apparatus system is a relatively small.

With either method, a so-called "softly broken apparatus" can be realized by functional redundant type repair.

Although in the above described functional redundancy system using the copying machine as an objective apparatus, the image forming mechanism is taken as an example, the present invention is not limited to the same. For example, it is possible to also realize such a functional redundancy system that when a neutralization lamp for removing charges on a photosensitive drum is put off, light of a halogen lamp is introduced into the photosensitive drum to remove the charges on the photosensitive drum. Alternatively, it is possible to also realize such a functional redundancy system such that when a fault occurs in a cleaner of a photosensitive drum, the photosensitive drum is cleaned utilizing a magnetic blush provided for a developing system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A function redundancy control system for an apparatus including a plurality of elements controllable by a control means, each of said plurality of controllable elements having ability to perform a predetermined function inherently required in the apparatus, said system comprising:

retrieving means for determining whether controllable elements of said plurality are controllable to perform a potential function which is substantially the same as a predetermined inherent function of another one of said plurality of controllable elements and which potential function is not ordinarily performed, and for identifying controllable elements having said potential function; and redundancy system control means for causing one of said controllable elements to perform the potential function thereof after said one controllable element has been identified by said retrieving means.

2. The function redundancy system control system according to claim 1, wherein said retrieving means comprises:

storing means for storing data describing at least a part of an apparatus, which is a control object, in a predetermined relational representation using functions, behaviors and states, said representation defining a FBS diagram;

FBS retrieving means for retrieving data indicative of present potential functions on the basis of the FBS diagram stored in the storing means; and means for determining a potential function to be performed on the basis of retrieved data from said FBS retrieving means.

3. The function redundancy system control system according to claim 2, wherein said FBS diagram clearly represents a many-to-many correspondence between a plurality of functions and a plurality of behaviors.

4. The function redundancy system control system according to claim 1, which further comprises diagnosing means for diagnosing a fault in the apparatus which is a control object, said retrieving means being operated when it is judged by said diagnosing means that a fault occurs in the apparatus which is a control object.

5. The function redundancy system control system according to claim 3, which further comprises diagnosing means for diagnosing a fault in the apparatus which is a control object, said retrieving means being operated when it is judged by said diagnosing means that a fault occurs in the apparatus which is a control object.

6. A function redundancy system control system comprising:

storing means for storing data describing at least a part of an apparatus in predetermined relational representation using function, behaviors and states, said representation defining a FBS diagram, said data representing controllable elements of the apparatus, which elements perform inherent functions required during normal operation of the apparatus, at least some of the controllable elements being controllable, during redundancy operation of the apparatus, to perform a substitutable function that is substantially the same as the inherent function of other controllable elements of the apparatus;

retrieving means for retrieving a substitutable function which can be substituted for a particular inherent function of a certain controllable element in the apparatus on the basis of the FBS diagram stored in the storing means; and redundancy system control means for operating the apparatus by causing one of said at least some controllable elements to perform the substitutable function retrieved by said retrieving means.

7. The function redundancy system control system according to claim 6, wherein said FBS diagram clearly represents a many-to-many correspondence between a plurality of functions and a plurality of behaviors.

8. The function redundancy system control system according to claim 7, which further comprises diagnosing means for diagnosing a fault in the apparatus which is a control object, said retrieving means being operated when it is judged by said diagnosing means that a fault occurs in the apparatus which is a control object.

9. The function redundancy system control system according to claim 8, wherein said diagnosing means comprises:

storing means for storing qualitative data representing the apparatus which is a control object as a combination of a plurality of elements including said controllable elements and qualitatively representing behaviors and attributes of the respective elements and the combinational relationship among the elements using parameters;

operating means for diagnosing an operating state when the apparatus which is a control object is operated by said redundancy system control means, for simulating operation of the apparatus on the basis of the qualitative data stored in said storing means when it is judged that the operating state is not normal, and for obtaining an adjusting work plan which can be carried out by adjusting a parameter on the basis of the results of the simulation; and parameter type state adjusting means for executing the adjusting work plan obtained by the operating means.

10. The functional redundancy system control system according to claim 8, wherein said diagnosing means comprises:

storing means storing qualitative data representing functional means in said apparatus as a combination of a plurality of elements including said controllable elements and qualitatively representing behaviors and attributes of the respective elements and the combination relationship among the elements using parameters;

operating means for obtaining a fault repair work plan which can be performed by changing a parameter on the basis of qualitative data stored in the storing means when it is judged that a fault occurs in the apparatus which is a control object;

parameter type fault repair means for executing the fault repair work plan obtained by the operating means; and means for outputting, when the fault in the apparatus which is a control object cannot be repaired by executing the fault repair work plan by the parameter type fault repair means, the occurrence of the fault.

11. The function redundancy system control system according to claim 10, wherein said diagnosing means further comprises:

operating means for diagnosing an operation state when the apparatus which is a control object is operated by said redundancy system control system, for simulating operation of said functional means in said apparatus on the basis of qualitative data stored in said storing means when it is judged that the operating state is not normal, and for obtaining an adjusting work plan which can be carried out by adjusting a parameter on the basis of the results of the simulation; and parameter type state adjusting means for executing the adjusting work plan obtained by the operating means.

12. An apparatus having a functional redundancy system and being operable in an ordinary operation sequence and a redundancy operation sequence, said apparatus comprising:

control means; and a plurality of elements controlled by the control means, each of the plurality of controlled elements being controlled, during the ordinary operation sequence of said apparatus, by the control means to perform only a predetermined inherent function that is performed thereby and at least one element of the plurality of controlled elements being controllable by the control means to perform a potential function which is substantially the same as the predetermined inherent function of another one of the controlled elements, and which is not ordinarily performed by the said at least one controlled element, the control means including:

ordinary control means for operating the plurality of controlled elements in accordance with the ordinary operation sequence such that said plurality of controlled elements perform their inherent functions; and redundancy system control means for operating the said at least one controlled element in accordance with the redundancy operation sequence which is different from said ordinary operation sequence such that the inherent function of the said another one of the controlled elements is replaced by the potential function performed by the said at least one controlled element.

13. The apparatus having a functional redundancy system according to claim 12, wherein the said another one of the controlled elements can designate a predetermined plurality of said controlled elements, and said redundancy system control means performs operation in accordance with a predetermined sequence out of a predetermined plurality of redundancy operation sequences depending on which of the controlled elements has been designated by the said another one of the controlled elements.

14. The apparatus having a functional redundancy system according to claim 13, which comprises a ROM storing said predetermined plurality of sequences.

15. An apparatus having a functional redundancy system and being operable in an ordinary operation sequence and a redundancy operation sequence, said apparatus comprising:

functional means, said functional means including a plurality of controlled elements, each controlled element of said plurality having a predetermined inherent function that is performed thereby during the ordinary operation sequence of said apparatus, and at least one controlled element of said plurality having a potential function which is substantially the same as the predetermined inherent function of another one of the controlled elements and which is not ordinarily performed;

diagnosing means for making a diagnosis to judge whether or not a fault is present in said functional means;

ordinary control means for controlling said plurality of controlled elements in accordance with the ordinary operation sequence such that such plurality of controlled elements perform the inherent functions thereof when it is judged by said diagnosing means that no fault is present; and redundancy system control means for controlling, when it is judged by said diagnosing means that a fault is present, a controlled element other than a controlled element which has failed in accordance with the redundancy operation sequence which is different from the ordinary operation sequence such that the inherent function of the controlled element which has failed is replaced by the potential function performed by another controlled element.

16. The apparatus having a functional redundancy system according to claim 15, wherein said redundancy system control means performs a control operation in accordance with a predetermined sequence out of a predetermined plurality of redundancy control sequences to correspond to the type of a controlled element which has failed.

17. The apparatus having a functional redundancy system according to claim 16, which comprises a ROM storing said predetermined plurality of sequences.

18. The apparatus having a functional redundancy system according to claim 15, wherein said diagnosing means diagnoses, when a controlled element is controlled by said redundancy system control means, an operating state of the controlled element controlled by the redundancy control means.

19. The apparatus having a functional redundancy system according to claim 18, wherein said diagnosing means comprises:

storing means for storing qualitative data representing said functional means as a combination of a plurality of elements including said controlled elements and qualitatively representing behavior and attributes of the respective elements and the combinational relationship among the elements using parameters;

operating means for simulating, when a controlled element is controlled by said redundancy system control means, operation of the controlled element controlled by the redundancy system control means on the basis of qualitative data stored in said storing means when it is judged that an operating state of the controlled element is not normal, and for obtaining an adjusting work plan which can be carried out by adjusting a parameter on the basis of the results of the simulation; and parameter type state adjusting means for executing the adjusting work plan obtained by the operating means.

20. The apparatus having a functional redundancy system according to claim 15, wherein said diagnosing means comprises:

storing means for storing qualitative data representing said functional means as a combination of a plurality of elements including said controlled elements and qualitatively representing behaviors and attributes of the respective elements and the combinational relationship among the elements using parameters;

operating means for obtaining, when it is judged that a fault occurs in said functional means, a fault repair work plan which can be performed by changing a parameter on the basis of the qualitative data stored in the storing means;

parameter type fault repairing means for executing the fault repair work plan obtained by the operating means; and means for outputting, when the fault in the functional means cannot be repaired by executing the fault repair work plan by the parameter type fault repairing means, the occurrence of the fault.

21. The apparatus having a functional redundancy system according to claim 20, wherein said diagnosing means further comprises:

operating means for diagnosing, when a controlled element is controlled by said redundancy system control means, an operating state of the controlled element controlled by the redundancy system control means, for simulating operation of the controlled element on the basis of qualitative data stored in said storing means when it is judged that the operating states is not normal, and for obtaining an adjusting work plan which can be carried out by adjusting a parameter on the basis of the results of the simulation; and parameter type state adjusting means for executing the adjusting work plan obtained by the operating means.

\* \* \* \* \*